(12) United States Patent
Bulgrin et al.

(10) Patent No.: US 6,682,669 B2
(45) Date of Patent: Jan. 27, 2004

(54) MODEL PREDICTIVE CONTROL APPARATUS AND METHODS FOR MOTION AND/OR PRESSURE CONTROL OF INJECTION MOLDING MACHINES

(75) Inventors: Thomas C. Bulgrin, Columbia Station, OH (US); Andrew Schuplin, Valley City, OH (US)

(73) Assignee: Van Dorn Demag Corporation, Strongsville, OH (US)

( * ) Notice: Subject to any disclaimer, the term of this patent is extended or adjusted under 35 U.S.C. 154(b) by 297 days.

(21) Appl. No.: 09/967,731

(22) Filed: Sep. 29, 2001

(65) Prior Publication Data

US 2003/0080452 A1 May 1, 2003

(51) Int. Cl.⁷ ............................................... B29C 45/76
(52) U.S. Cl. ........................ 264/40.1; 264/40.5; 425/145
(58) Field of Search ............................. 264/40.1, 40.5, 264/328.1; 425/145, 149

(56) References Cited

U.S. PATENT DOCUMENTS

| | | |
|---|---|---|
| 5,456,870 A | 10/1995 | Bulgrin |
| 5,493,503 A | 2/1996 | Richards et al. |
| 5,955,117 A | 9/1999 | Ito et al. |
| 5,997,778 A | 12/1999 | Bulgrin |
| 6,089,849 A | 7/2000 | Bulgrin et al. |

*Primary Examiner*—Jill L. Heitbrink
(74) *Attorney, Agent, or Firm*—Fay, Sharpe, Fagan, Minnich & McKee, LLP

(57) ABSTRACT

Methods and apparatus are disclosed for controlling an injection molding machine, wherein a control law estimates future machine states according to a proposed control output vector, the current machine state and a model of the machine, and recursively refines the control output vector using an error function and an adjustment rule in order to reduce the error between the estimated future machine states and desired future machine states. One or more control outputs are provided to actuators associated with the machine according to the refined control output vector.

60 Claims, 16 Drawing Sheets

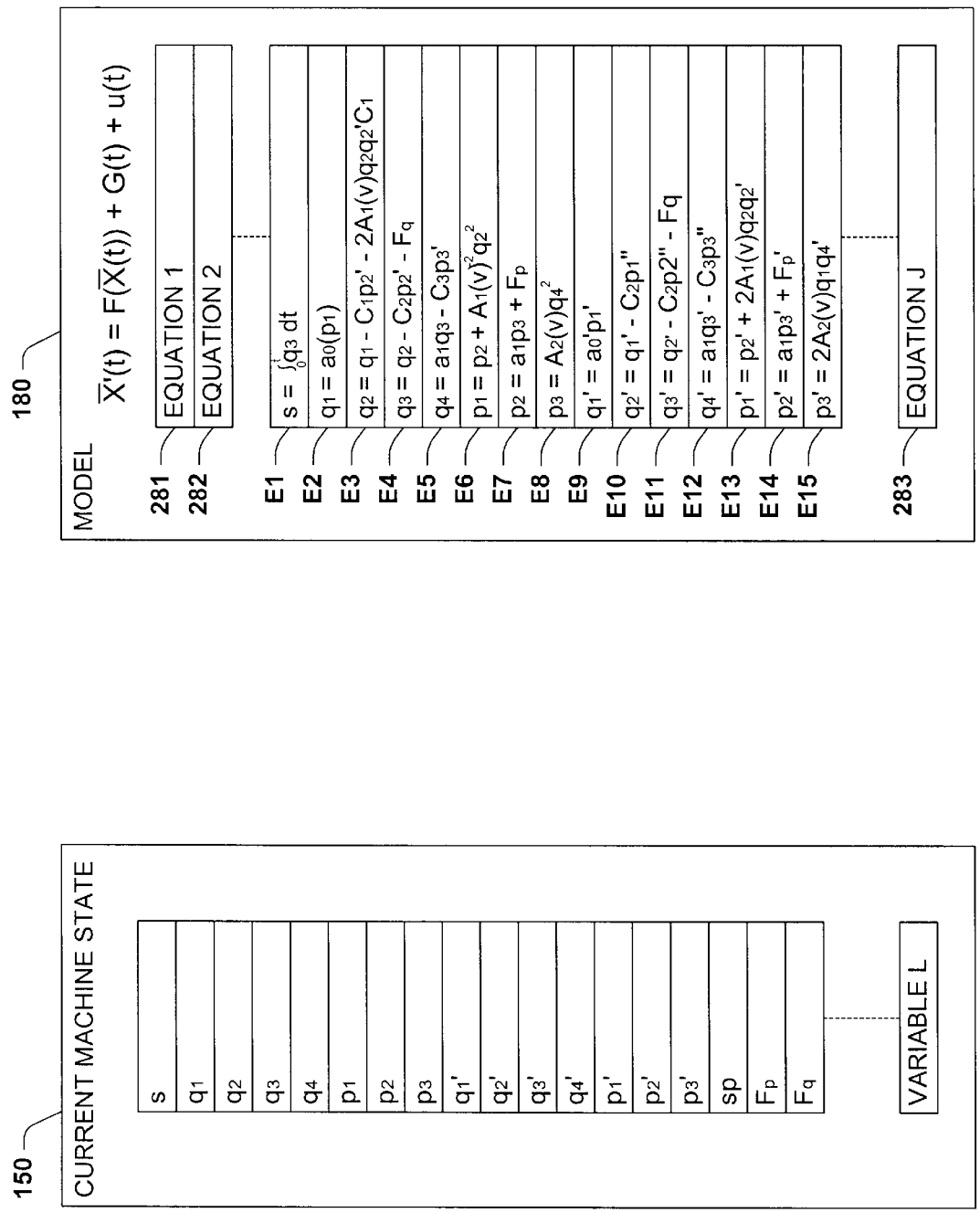

MODEL 180

$$\bar{X}'(t) = F(\bar{X}(t)) + G(t) + u(t)$$

281 — EQUATION 1
282 — EQUATION 2

E1  $s = \int_0^t q_3 \, dt$
E2  $q_1 = a_0(p_1)$
E3  $q_2' = q_1 - C_1 p_2' - 2A_1(v) q_2 q_2' C_1$
E4  $q_3' = q_2 - C_2 p_2' - F_q$
E5  $q_4' = a_1 q_3 - C_3 p_3'$
E6  $p_1' = p_2 + A_1(v) q_2^2$
E7  $p_2' = a_1 p_3 + F_p$
E8  $p_3' = A_2(v) q_4^2$
E9  $q_1' = a_0' p_1'$
E10 $q_2'' = q_1' - C_2 p_1''$
E11 $q_3'' = q_2' - C_2 p_2'' - F_q$
E12 $q_4'' = a_1 q_3' - C_3 p_3'''$
E13 $p_1'' = p_2' + 2A_1(v) q_2 q_2'$
E14 $p_2'' = a_1 p_3' + F_p'$
E15 $p_3'' = 2A_2(v) q_1 q_4'$

283 — EQUATION J

Fig. 6

CURRENT MACHINE STATE 150

| s | $q_1$ | $q_2$ | $q_3$ | $q_4$ | $p_1$ | $p_2$ | $p_3$ | $q_1'$ | $q_2'$ | $q_3'$ | $q_4'$ | $p_1'$ | $p_2'$ | $p_3'$ | sp | $F_p$ | $F_q$ |

VARIABLE L

Fig. 5

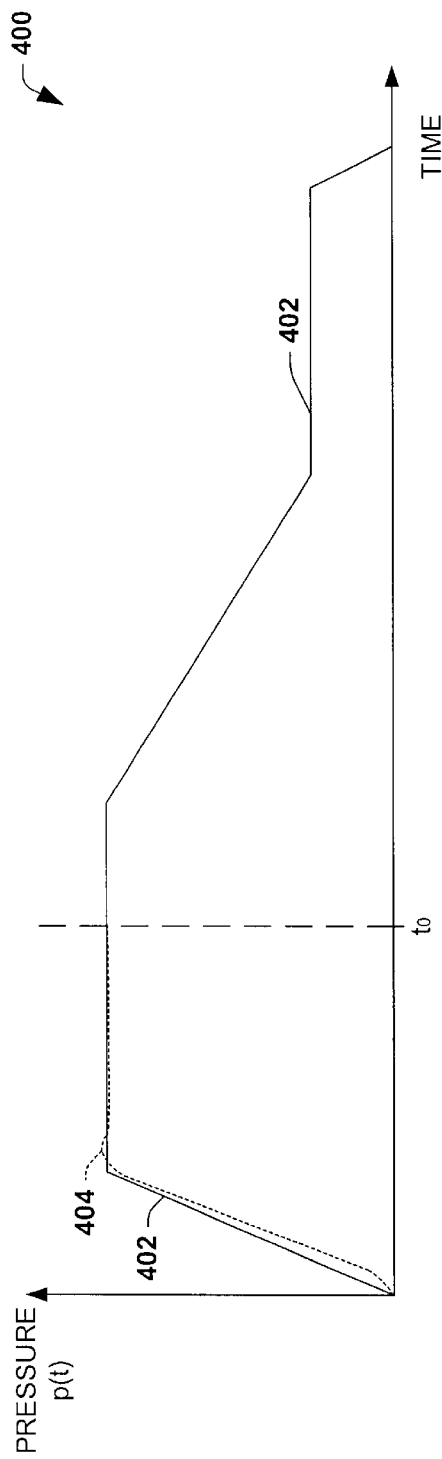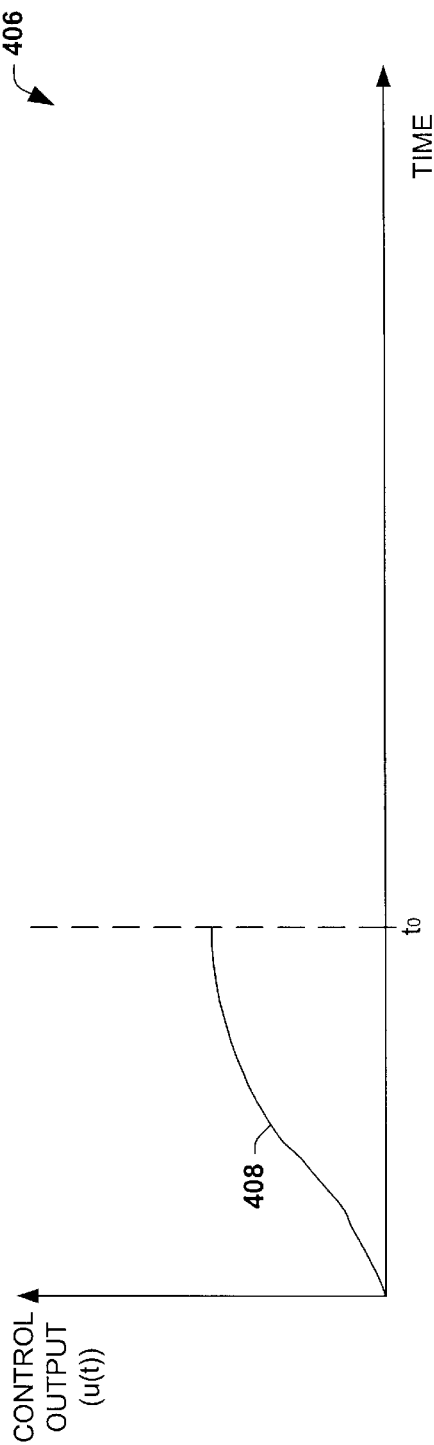

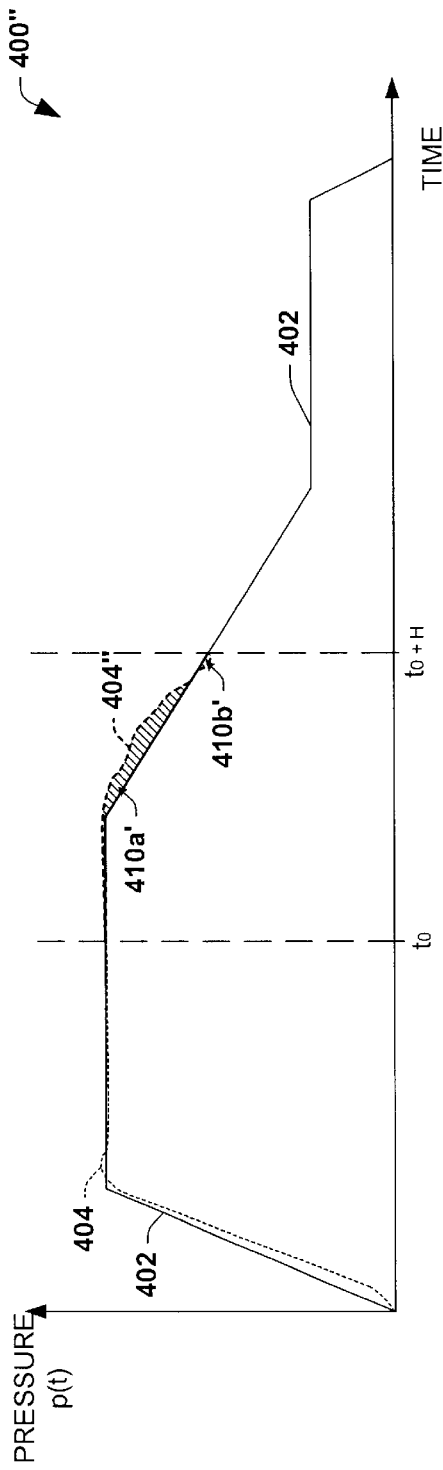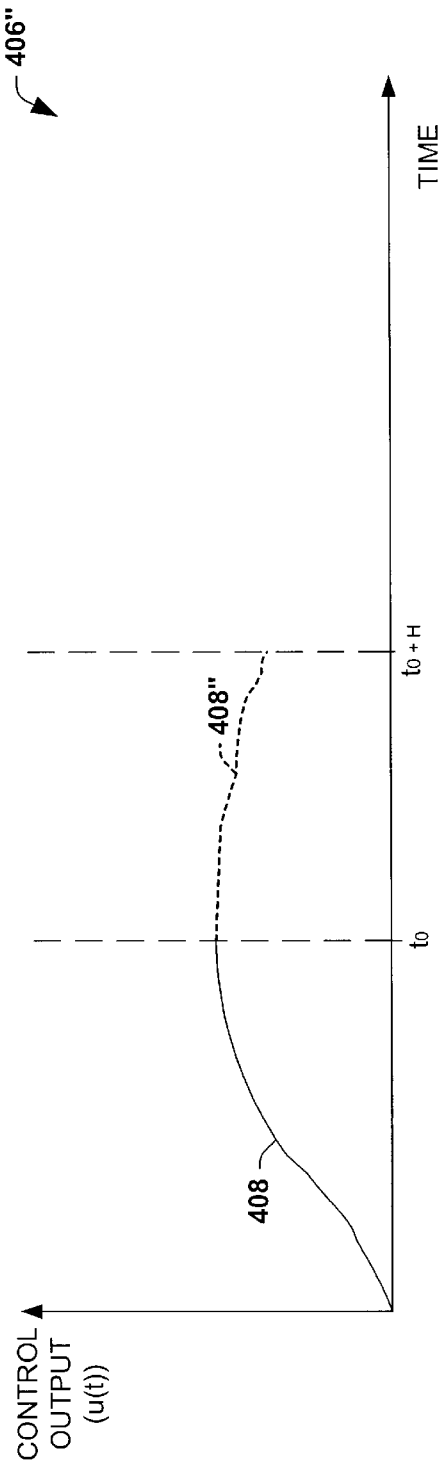
Fig. 11a
Fig. 11b

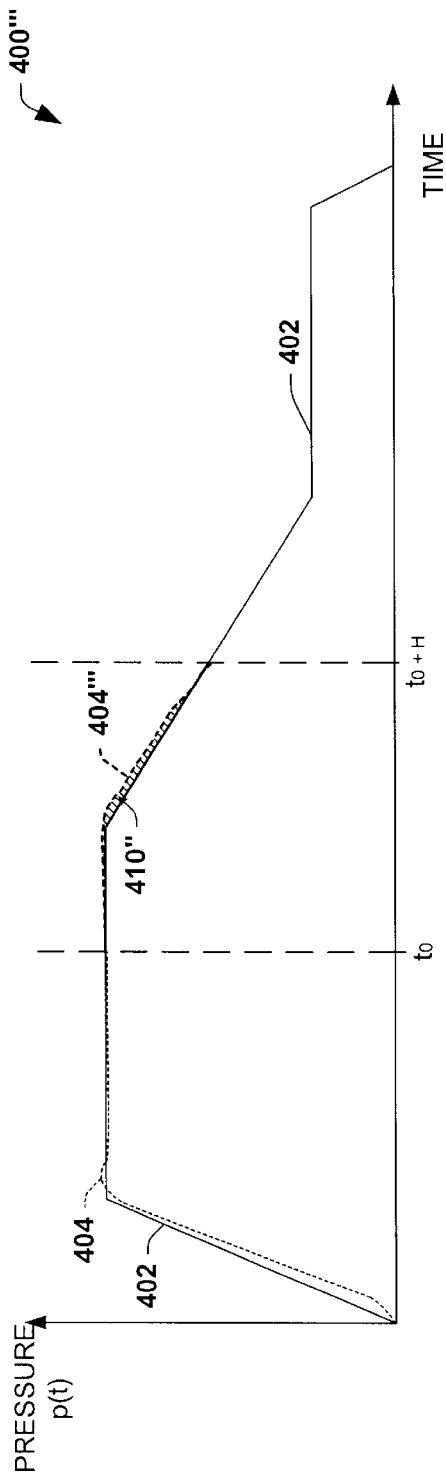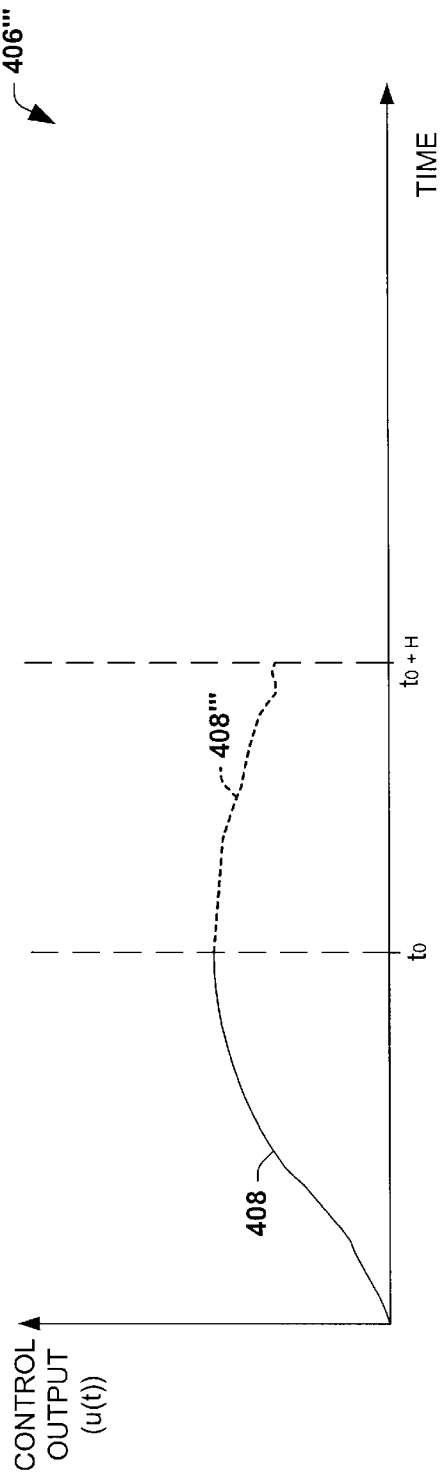

MODEL PREDICTIVE CONTROL APPARATUS AND METHODS FOR MOTION AND/OR PRESSURE CONTROL OF INJECTION MOLDING MACHINES

FIELD OF INVENTION

The invention relates generally to the art of injection molding and more particularly to methods and apparatus for controlling motion and/or pressure in an injection molding machine.

BACKGROUND OF THE INVENTION

Injection and other types of molding machines are complex systems, typically operated in multiple steps or phases, in order to provide a molded part or parts in a molding cycle. Once a finished part is removed from the machine, the molding cycle is repeated to produce further parts. A typical injection molding machine operational cycle includes clamp, inject, pack and hold, recovery, and eject steps, each of which involves moving machine components and motion control thereof. The clamp phase joins the individual sides or portions of a mold together for receipt therein of plastic molding material, in the form of a melt. In the inject phase, a reciprocating screw or ram within a cylindrical barrel pushes or injects a plasticized melt through an orifice at the barrel end or nozzle, which in turn provides the melt to the interior cavity of the mold. Further material is then provided to the mold and force is maintained during a pack and hold phase, and the eject phase separates the molded part from the separated mold halves. The screw is retracted in the barrel during a recovery phase while the screw is rotated to advance new plastic material through screw flights into the barrel space forward of the screw, whereupon the cycle may be repeated.

Each of the molding machine phases may involve linear and/or rotational motion of one or more machine components, which motions are implemented using appropriate actuators in a controlled fashion. The actuators for such machine component motion can be of various forms, such as hydraulic actuators, rotary and linear electric motors, and the like. The various rotational and/or translational motions of the molding machine components are often controlled according to predetermined profiles in order to achieve the desired molded parts, while attempting to ensure complete filling of the mold, reduce cosmetic and structural problems in the molded parts, eject molded parts without damage, and to minimize cycle time to achieve acceptable machine throughput. In addition to motion control, such molding machines also include controls and actuators for controlling temperatures, pressures, and other process variables in the machine. Many contemporary injection molding machines employ a combination of open-loop command type control for non-critical motions, such as for clamping and ejection, in combination with closed-loop control for injection ram velocity, hold pressure, back pressure, and screw rotation speed control.

Controls for injection molding machines have evolved from early manual controls wherein plastic was injected into a mold when a crank wheel was turned, to programmable logic controllers operating the machine actuators in closed loop fashion using sensor inputs to implement a control law, typically proportional, integral, derivative (PID) control. Conventional injection molding machine PID controllers receive sensor inputs indicative of machine component motion (e.g., position, velocity, etc.), which are then compared with desired motion values (e.g., set point values) to derive an error value. Control outputs are derived from the error value and are provided to actuators in the machine, such as hydraulic valves, electric motors, or the like, in order to reduce the error. PID controllers provide such control output signals which are proportional to the error, the integral of the error, and/or the derivative of the error, wherein PID coefficients $k_p$, $k_i$, and $k_d$ are set to provide relative weighting for the proportional, integral, and derivative components of the control output signal. More recently, molding machine controllers have provided more advanced functionality, such as combining auto-tuned PID with a predictive open-loop term and an adaptive learned disturbance correction term, as set forth in my U.S. Pat. No. 5,997,778, the disclosure of which is hereby incorporated by reference as if fully set forth herein. The present invention provides an improvement to the conventional molding machines and controls therefor illustrated and described in U.S. Pat. No. 5,997,778.

Motion of various components in a molding machine are commonly controlled according to a user-defined profile. For instance, a user may define a desired profile for ram velocity versus position or time to be used during an injection step, sometimes referred to as a velocity profile. Alternatively or in combination, such moving components may be controlled according to a user-defined pressure profile, such as melt pressure profile defined in terms of pressure with respect to time. A machine cycle, moreover, may employ one or more such profiles for various steps therein. For example, the injection ram translation may be controlled according to a velocity profile during the injection step, after which pressure profile type control is employed during a pack and hold step. Furthermore, different profiles and/or profile types may be used to control different subsystems within a molding machine. In this regard, velocity profiling may be used to control the ram during injection, whereas pressure profiling may be used to control a clamping system operation.

Where velocity profiling is used, the user defines the desired profile, which establishes the desired velocity of one or more moving machine components with respect to position. The controller then uses the profile as a series of set point values (e.g., and/or derives further set point values therefrom) for the control law in order to implement a particular machine phase in a molding cycle. For instance, the user typically defines a desired piecewise linear translational velocity profile with respect to position, for movement of the injection ram during an injection step. Alternatively, the user may define a pressure versus time profile for the melt in the barrel during injection, which can be used to control the linear ram force during injection. Similarly, user-defined profiles may be used in controlling rotational movement of the ram, heating of the barrel, clamping of the mold halves, movement of the carriage, and/or ejecting finished parts from the separated mold.

To facilitate user entry of such desired control profiles, molding machines often include an operator station or user interface with a screen display and keyboard which sends signals to a programmable logic controller (PLC). For example, such a user interface may allow an operator to define desired ram velocities at fixed ram travel increments or zones. The operator sets the desired ram velocity at each zone, from which a series of bar graphs are assembled. The ram movement is then controlled so as to follow the bar graphs. More recently, the bar graphs have been replaced with points at each zone boundary so that the ram is not programmed to travel at constant speed within each zone.

Rather, the ram is controlled according to a linear interpolation which varies from one set point at one zone boundary to another set point at an adjacent zone boundary. Thus, in defining a number of desired velocity settings at set ram travel positions which the ram is to follow, a "velocity profile" is established. The molding machine controller then attempts to cause the ram to travel at the user set speeds at the user set positions i.e., to emulate the velocity profile, by providing corresponding control output signals to one or more actuators in the machine.

In a conventional molding machine, the controller receives a velocity feedback signal from a velocity sensor on the machine and compares it with the user set velocity profile to generate an error compensated control output value by which the injection ram speed is controlled. Alternatively, a position signal is received from a ram longitudinal position sensor, and is differentiated, either in hardware or in software, in order to derive velocity information therefrom. Where the linear actuator for the injection ram is hydraulic, the control output value is converted to an analog control signal, which is then provided to a solenoid valve actuator regulating a hydraulic proportional flow control valve. The valve, in turn, controls flow from a pump to a prime mover causing ram movement. The user-defined velocity profile is typically converted into a series of velocity set points (e.g., and/or pressure set points) used by the controller in generating appropriate control output values during machine motion. The PLC thus provides closed loop control (e.g., via feedback signals from a ram position or velocity sensor) by providing a drive signal to the hydraulic control valve. Alternatively, where the ram is linearly actuated by an electric motor, the controller provides velocity signals as control outputs to a motor drive. The drive, in turn, provides corresponding current to the motor actuator in order to achieve the desired ram velocity. Such closed loop type control may also be combined with open loop control during certain non-critical portions of one or more motion control sub-systems.

Although PID and other type controls have thusfar been employed in controlling various motions in molding machines, improved control capabilities are desirable, in order to improve finished part quality, repeatability, and cycle time. For instance, non-linearities in the molding machine and high order energy storage prevent optimal control of the motion of various components, such as the injection ram. Such non-linearities include, for example, ball screw friction associated with the injection ram. In addition, energy storage occurs as hydraulic hoses in the system are subject to transverse expansion depending upon pressures in the hydraulic fluid. Electric motor type actuators also suffer from non-linear behavior, due to backlash, heating effects, noise, and the like. Furthermore, other disturbances in the machine cause non-linear or indeterminate behavior, such as hydraulic fluid leakage. PID and other controllers are of limited order and therefore cannot cancel high order dynamics of the system. Also, conventional controls require tuning of the various control coefficients (e.g., $k_p$, $k_i$, and $k_d$) associated therewith, in order to achieve good control. However, tuning these coefficients may be beyond the capabilities of the end user of such molding machines. Moreover, the tuning capabilities provided by $k_p$, $k_i$, and $k_d$ in a PID controller are not sufficient to optimize the control operations of such machines, where non-linearities, high order dynamics, highly variable disturbances, and other indeterminate conditions are present. Consequently, there is a need for molding machine motion control apparatus and methodologies by which improved machine performance can be achieved in the presence of such conditions.

SUMMARY OF THE INVENTION

The following presents a simplified summary of the invention in order to provide a basic understanding of some aspects of the invention. This summary is not an extensive overview of the invention. It is intended neither to identify key or critical elements of the invention, nor to delineate the scope of the invention. Its primary purpose is to present some concepts of the invention in a simplified form as a prelude to the more detailed description that is presented later. The present invention is directed to control methods and apparatus finding application in association with various types of molding machines, such as injection molding machines, blow molding machines, and the like. A control law is provided, which estimates future machine states according to a proposed or hypothetical control output vector, a current machine state and a model of the machine, and recursively refines the control output vector using an error function and an adjustment rule in order to reduce the error between the estimated future machine states and desired future machine states.

The current machine state may be provided by an observer, using the model and current machine sensor signals, by which the number of required sensors can be reduced. Alternatively or in combination, the observer may provide the current machine state using a model with no sensor inputs, for instance, where a control output u(t) is known. One or more control outputs are provided to actuators associated with the machine according to the refined control output vector, where the actuators may be of any type, including but not limited to hydraulic and electric, linear and rotary actuators. The invention thereby achieves non-linear model predictive control with distinct advantages over conventional molding machine motion and/or pressure control apparatus and methodologies, via the employment of a non-linear model of the machine behavior and the iterative or recursive control output refinement. In this regard, the control apparatus and methodologies of the present invention can be advantageously employed so as to provide shorter rise times, reduced overshoot, improved disturbance rejection characteristics, and improved profile emulation as compared with conventional molding machine controls.

One aspect of the invention provides a system for controlling motion or pressure in a non-linear injection molding machine. The control system comprises a model and a control law, wherein the model comprises a plurality of state equations representative of behavior of the injection molding machine. The control law comprises a simulator component, which simulates estimated future states of the injection molding machine according to a proposed control output vector having control output values representative of control outputs at a current time and at future times. The simulator provides the estimated future states using a current state vector with state values representative of a current state of the injection molding machine and the machine model.

The control law further comprises an error function evaluator, which determines an error between the estimated future states and desired future states, such as a velocity profile, as well as an adjustment rule, which adjusts the proposed control output vector according to the error to provide a refined proposed control output vector. The control law refines the proposed control output vector using the adjustment rule, simulates refined estimated future states using the simulator, and determines a refined error between the refined estimated future states and the desired future states in recursive fashion until a termination condition occurs, such as when a maximum time has expired, a maximum number of iterations have occurred, or when the error or the rate of change thereof is less than a threshold. A control output is then provided to one or more actuators in the molding machine according to the most recently refined proposed control output vector.

According to another aspect of the invention, the control system may also comprise an observer receiving sensor inputs, which estimates the current state of the injection molding machine using the model and the sensor inputs. The model may comprise one or more differential equations, where the observer solves the differential equations using the proposed control output vector and the current state vector to provide the current state of the machine, including measured and/or unmeasured states. Similarly, the simulator operates to solve the differential equations to estimate future machine states. In one implementation, the differential equations of the model may be solved using a Runge-Kutta method. Alternatively, difference equation techniques can be employed to solve the differential equations of the model. Once the control output is thus determined for a given control cycle, the control law may save at least a portion of the most recently refined proposed control output vector. In a subsequent control cycle, the control law provides a first proposed control output vector according to a previously saved proposed control output vector from a prior control cycle. In this fashion, the invention provides for reducing the number of iterations required to achieve a given control output refinement.

The control law may further comprise a control output function and a control output parameter translator, wherein the adjustment rule is operative to correlate or generate one or more coefficients from the proposed control output vector according to the control output function. The adjustment rule then evaluates one or more partial differential equations for error with respect to the coefficients, and adjusts one or more of the coefficients so as to reduce the error, which may be done using a conjugate gradient technique in accordance with another aspect of the invention. The control output parameter translator then translates the adjusted coefficients according to the control output function to provide the refined proposed control output vector, which may then be used in a subsequent simulation.

In accordance with another aspect of the invention, a molding machine control system is provided, which comprises a model, an observer, and a control law, wherein the system controls motion and/or pressure in non-linear and/or linear molding machines. The observer receives sensor input values and estimates the current machine state using the model and the sensor values to provide a current state vector. The control law comprises a simulator, an error function evaluator, and an adjustment rule, wherein the simulator provides estimated future states according to a proposed control output vector using the current state vector and the model. The error function evaluator determines an error between the estimated future states and desired future states, and the adjustment rule adjusts the proposed control output vector according to the error to provide a refined proposed control output vector. The control law recursively refines the proposed control output vector until a termination condition occurs, and then provides a control output according to the most recently refined proposed control output vector.

Yet another aspect of the invention comprises methodologies for controlling motion and/or pressure in a non-linear injection molding machine. The methods comprise obtaining a current state vector, providing a proposed control output vector, and simulating a plurality of estimated future states according to the proposed control output vector using the current state vector and a model. The methods further comprise determining an error between the estimated future states and desired future states, and recursively refining the proposed control output vector according to the error. The refinement comprises simulating refined estimated future states according to the refined proposed control output vector using the current state vector and the model, and determining a refined error between the refined estimated future states and the desired future states until a termination condition occurs. Thereafter, a control output is provided to at least one actuator in the injection molding machine according to the most recently refined proposed control output vector. A portion of the final proposed control output vector may be saved for use in providing a first proposed control output vector in a subsequent control cycle.

The model may comprise one or more differential equations, wherein simulating the plurality of estimated future states comprises solving the differential equations using the proposed control output vector and the current state vector. The solution of the differential equations may be accomplished by numerical techniques, such as a Runge-Kutta method, and/or difference equation techniques. Obtaining the current state vector may comprise obtaining one or more sensor input values and estimating the current state of the injection molding machine using the model and the sensor input values, such as by computing state values representative of a current machine state using the model, and forming a current state vector using the computed state values. In addition, refining the proposed control output vector may comprise generating coefficients from the proposed control output vector according to a control output function, evaluating one or more partial differential equations for error with respect to the coefficients, and adjusting one or more of the coefficients so as to reduce the error. The coefficients may me adjusted, for example, using a conjugate gradient method. The adjusted coefficients are then translated according to the control output function to provide the refined proposed control output vector.

Still another aspect of the invention provides a method for controlling motion or pressure in an injection molding machine, comprising obtaining one or more sensor inputs, estimating a current machine state using the sensor inputs and a model, and providing a proposed control output vector having a plurality of control output values representative of control outputs at a current time and at future times. The method further comprises simulating estimated future states of the molding machine according to the proposed control output vector using the current state and the model, determining an error between the estimated future states and desired future states, and recursively refining the proposed control output vector. The refinement comprises simulating refined estimated future states of the injection molding machine according to the refined proposed control output vector using the current state and the model, and determining a refined error between the refined estimated future states and the desired future states until a termination condition occurs. A control output is then provided according to the most recently refined proposed control output vector.

To the accomplishment of the foregoing and related ends, the following description and annexed drawings set forth in detail certain illustrative aspects and implementations of the invention. These are indicative of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 5 is a schematic diagram illustrating an exemplary current machine state vector for the molding machine of FIG. 3 in accordance with the invention;

FIG. 6 is a schematic diagram illustrating an exemplary model of the molding machine of FIG. 3;

FIGS. 9a and 9b illustrate exemplary graphs of velocity and control output, respectively, through time $t_0$ for a ram injection stroke in the molding machine of FIG. 3 using a control system and methodologies in accordance with the invention;

FIGS. 11a and 11b illustrate the graphs of velocity and control output of FIGS. 9–10, including refinement in estimated future velocity states, proposed control output vector, and velocity error in accordance with the invention;

FIGS. 12a and 12b illustrate the graphs of velocity and control output of FIGS. 9–11, including further refinement in estimated future velocity states, proposed control output vector, and velocity error in accordance with the invention;

DETAILED DESCRIPTION OF THE INVENTION

Figure 1:
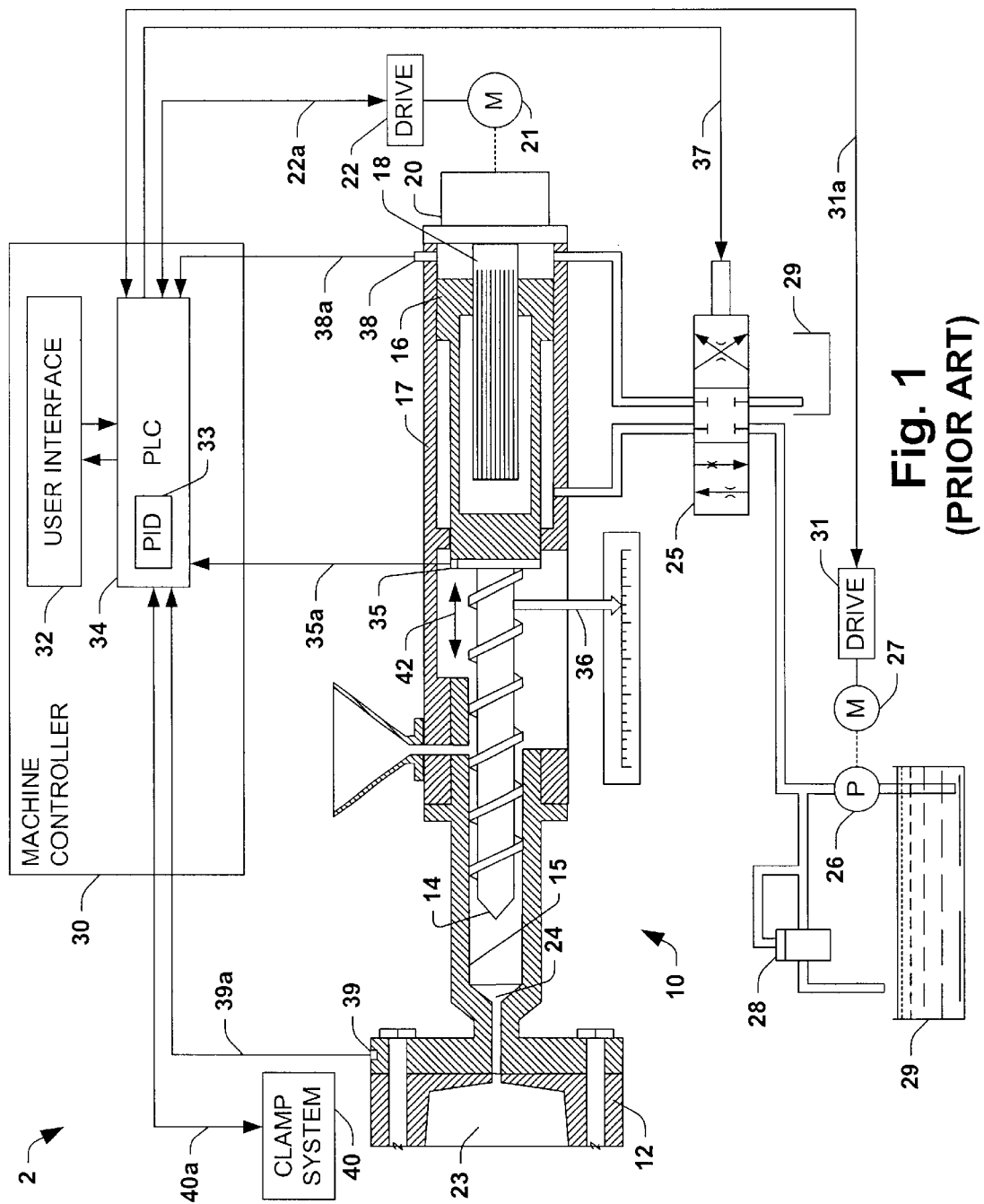
FIG. 1 is a partial side elevation view in section illustrating a conventional injection molding machine with a PLC type controller.

One or more exemplary implementations of the present invention will now be illustrated and described with reference to the drawings, wherein like reference numerals are used to refer to like elements throughout. The present invention relates to methods and apparatus for molding machine motion and/or pressure control, wherein future machine states are estimated according to a proposed control output vector, the current machine state, and a model of the machine, and the control output vector is refined using an error function and an adjustment rule in order to reduce the error between the estimated future machine states and desired future machine states. One or more control outputs are then provided to actuators associated with the machine according to the refined control output vector. Although various aspects of the present invention are illustrated and described hereinafter with respect to one or more exemplary injection molding machines, the invention finds utility in association with molding machines generally. In addition, the invention can be employed in operating a variety of molding machine actuators in a controlled fashion, including but not limited to hydraulic actuators and electric motors.

Referring now to the drawings wherein the showings are for the purpose of illustrating one or more exemplary implementations of the invention only and not for the purpose of limiting the same, FIG. 1 illustrates an injection molding machine 2 having an injection mechanism 10. A portion of a clamp mechanism and a mold mechanism 12 is also shown. The injection mechanism 10 includes an injection screw or ram 14 translatably and rotatably disposed within a tubular barrel 15. In the illustrated mechanism 10, translation of the screw 14 within the barrel 15 is achieved by a hydraulic actuator or hydraulic coupling having a sealed piston 16 movable within a cylinder 17. Rotation of the screw 14 is accomplished through rotation of a drive shaft 18 secured to a mechanical gearbox coupling 20. The gear box 20 is connected to and driven by an electric motor 21 with a corresponding motor drive 22. Alternatively, rotation of the screw 14 can occur by a conventional hydraulic piston motor (not shown). The drive shaft 18 is splined to the piston 16 so that the piston 16 can slide within the cylinder 17 so as to cause translation of the screw 14 while the rotation of the drive shaft 18 causes the piston 16 to rotate the screw 14 for screw recovery purposes, or the like.

When the screw 14 moves by translation towards the mold mechanism 12 to inject molding material (not shown) into a mold cavity 23, it is commonly referred to as a "ram", although other terminology such as "plunger" may be used to describe the screw 14 during injection. A typical injection stroke or phase of the molding cycle begins when molding material pushed by the ram 14 leaves an open end 24 of the barrel 15 (shut-off valve not shown) to initially enter a mold cavity 23, and continues until the mold cavity 23 is initially filled with molding material whereat the injection stroke ends. Further movement of the ram 14 is thereafter controlled in the packing and holding phase of the molding cycle, so as to supply additional molding material to the mold cavity 23 to account for volumetric contraction as the molding material solidifies. The translational motion of the piston 16 directly causes translational movement of the ram 14, and is controlled by a directional proportional flow control valve 25.

Although not illustrated in FIG. 1, in actual operation, an injection manifold may be provided, which includes, but is not limited to, valves controlling output (e.g., pressure and/or flow) from one or more injection pumps. Similarly a separate manifold (not shown) may be provided for valves controlling the mold clamp mechanism 12. However, in each such manifold, a separate proportional flow control valve may be used in the mechanism 10. In the illustrated mechanism 10, the proportional flow control valve 25 is flow controlled only, although separate proportional flow control valves may alternatively be provided to separately regulate both pressure and flow. Because of the pump size, the high torque output of the motor driving the pump and other considerations, pressure does not have to be separately controlled (other than by a conventional safety relief valve 28). Accordingly, in the mechanism 10 of FIG. 1, a constant delivery pump 26 is driven by a motor 27 and an associated motor drive 31, where the pump 26 has a capacity and the motor 27 has a horsepower such that flow control by the proportional flow control valve 25 will control the velocity of the ram 14. The pump 26 is provided with a conventional safety relief valve 28 connected to a sump 29.

In FIG. 1, a conventional machine controller 30 controls the operation of injection mechanism 10 and a clamp system 40 for clamping the mold 12. The controller 30 may further be employed for controlling other subsystems (not shown) in the machine 2, such as heaters for temperature control of the barrel 15, ejector systems for ejecting molded parts from the mold 12, or the like. The machine controller 30 includes a user interface or operator console station 32 at which an operator enters data or set points defining how the machine is to be operated and a programable logic controller (PLC) 34. The PLC 34 receives the operator instructions and sensor inputs from the machine, processes the data and generates control output driving signals to actuators on the machine for controlled operation thereof according to a proportional integral, derivative (PID) control component 33. The control component 33 may, but need not, include all three factors fo the PID, and also may include additional factors, such as for preventing integral windup.

For instance, the machine 2 has a ram travel position sensor 35 generating a transducer signal on a ram position sensor line 35a, a mold cavity pressure sensor 39 providing a pressure signal 39a, and a ram pressure sensor 38 providing pressure signal 38a. Other sensors (not shown) may be installed in the machine 2 to provide corresponding sensor signals to the controller 30. The controller 30, in turn, provides control output or drive signals to various actuators in the machine 2 for operation thereof in a controlled fashion. For instance, the PLC 34 generates an analog drive signal on drive signal line 37 to a solenoid valve controlling the operation of the proportional flow control valve 25 to control the translational movement of the ram 14 in the direction of arrow 42 during an injection phase of the molding cycle. In addition, the controller 30 provides control output signals 22a and 31a to motor drives 22 and 31, respectively, as well as signal 40a to the clamping system 40.

The amount at which the proportional flow control valve 25 is opened or closed controls the rate of flow of oil from the pump 26 to control the position and velocity of the piston 16 and ultimately that of the ram 14. The sensor 38 provides the signal 38a corresponding to the pressure exerted by the ram 14 on the melt in the barrel 15. Additionally or in combination, the injection molding machine 2 includes the pressure sensor 39 sensing the pressure of the melt in mold cavity 23 and providing a pressure signal 39a to the PLC 34. The pressure sensors 38 and/or 39 can be used as an additional signal to control the velocity of the ram 14.

While the controller 30 provides some measure of control over the various sub-systems in the molding machine 2, conventional controls do not allow for optimization of machine performance in certain respects. For instance, the PID control component 33 of the conventional controller 30 does not allow optimization of machine motion control in the presence of non-linearities or higher order effects in the machine 2. As used hereinafter, non-linearities include but are not limited to disturbances in the machine 2, non-linear components, high order dynamics such as energy storage, and indeterminate states, which the controller 30 either cannot measure, or otherwise does not take into account in generating control output signals to the various actuators associated with the machine 2. In particular, in molding machines such as machine 2, motion and/or pressure control has heretofore been less than optimal, due at least in part to the non-linear nature of sub-systems involving moving components, such as the translating ram 14 and the hydraulic systems therefor. Non-linearities are also present in the rotational actuation of the ram 14, and the clamping system 40 for clamping the mold 12. Conventional PID and other controllers may be adequate for process or system transfer functions having two dominant poles, whereas in actual injection molding machines, other poles exist which may have a significant impact on system performance. The present invention advantageously provides improved control apparatus and methods by which such non-linearities can be taken into account in order to achieve better control of the motions and/or pressures within molding machines such as machine 2.

Figure 2:
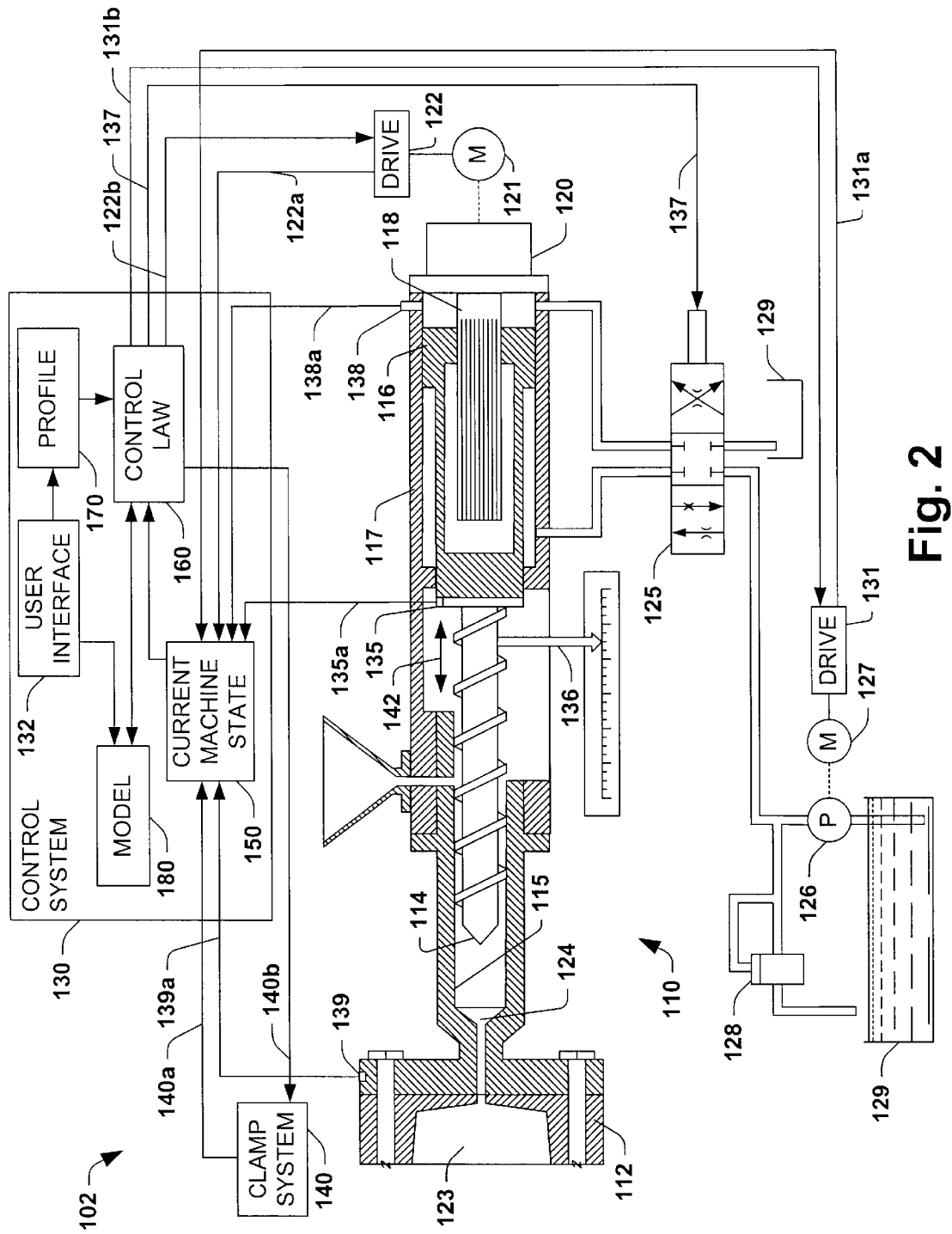
FIG. 2 is a partial side elevation view in section illustrating an injection molding machine with an exemplary control system in accordance with the present invention.

Referring now to FIG. 2, an exemplary injection molding machine 102 is illustrated, in which an injection mechanism 110 is illustrated for injecting a plasticized melt (not shown) into an interior cavity 123 of a mold 112 using a ram screw 114 in controlled fashion. The machine 102 includes or is operatively associated with a control system 130 in accordance with various aspects of the present invention, by which improved control of one or more component motions and/or pressures in the machine 102 can be achieved. Although illustrated and described hereinafter in the context of controlling the translational movement of various hydraulic actuation components associated with controlling the translational motion of the ram 114 to control melt pressure, the invention can be employed to control motion of and/or pressures associated with other components in molding machines apart from those illustrated and described herein, and all such implementations are contemplated as falling within the scope of the invention and the appended claims. In addition, while certain illustrative aspects of the invention are described in association with hydraulic actuators in the molding machine 102, it will be appreciated by those skilled in the art that the invention finds utility in association with controlling motion and/or pressure in molding machines via hydraulic actuation, electric motor actuators, and other forms of motion actuators, and that such implementations fall within the scope of the invention.

The injection mechanism 110 includes an injection screw or ram 114 translatably and rotatably disposed within a tubular barrel 115. The translation of the screw 114 in the direction of arrow 142 is achieved by a hydraulic actuator or hydraulic coupling including a sealed piston 116 movable within a cylinder 117. Rotation of the screw 114 is accomplished through rotation of a drive shaft 118 secured to a mechanical gearbox coupling 120. The gear box 120 is connected to and driven by an electric motor 121 with a corresponding motor drive 122. Alternatively, rotation of the screw 114 can occur by a conventional hydraulic piston motor (not shown). The drive shaft 118 is splined to the piston 116 so that the piston 116 can slide within the cylinder 117 so as to cause translation of the screw 114 while the rotation of the drive shaft 118 causes the piston 116 to rotate the screw 114.

In an injection stroke or phase of the molding cycle, molding material (not shown) is pushed by the ram 114 through an open end 124 of the barrel 115 (shut-off valve not shown) and into a mold cavity 123 until the mold cavity 123 is initially filled with molding material whereat the injection stroke ends. Further movement of the ram 114 is thereafter controlled in the packing phase of the molding cycle, so as to supply additional molding material to the mold cavity 123 to account for volumetric contraction as the molding material solidifies. The translational motion of the piston 16 directly causes translational movement of the ram 114, and is controlled by a directional proportional flow control valve 125. For purposes of brevity, the various aspects of the control apparatus and techniques of the present invention will hereinafter be illustrated and described with respect to the translational movement of the ram 114 during an injection stroke or phase, although the invention is applicable to all forms of motion and/or pressure control in molding machines.

The exemplary injection molding machine 102 further comprises a constant delivery pump 126 driven by a motor 127 and an associated motor drive 131, which controls the translational velocity and position of the ram 114, as schematically illustrated by the arrow scale 136. The pump 126 is provided with a conventional safety relief valve 128 connected to a sump 129. In accordance with an aspect of the present invention, the machine 102 comprises a control system 130 for providing various control output signals to operate one or more moving components therein (e.g., in the injection mechanism 110 and/or in the clamp system 140) in a controlled fashion. In addition, the control system 130 may be further operative to control other components of the machine 102 (not shown), such as heaters for the barrel 115, ejection components associated with the clamp system 140, or the like.

The exemplary control system 130 comprises a PC based hardware platform with microprocessor, memory (e.g., RAM, ROM, etc), and I/O circuitry for sending and receiving data to or from a user and/or a network (not shown). The various operational components of the control system 130 illustrated and described hereinafter may be implemented as software components or objects running in the hardware platform, which may be stored in, and operate on various data in, a data store in memory. It will be appreciated that the control apparatus according to the invention is not limited to such PC based hardware implementations, and may comprise various forms of hardware, software, and combinations thereof. The control system 130 further comprises appropriate signal conditioning and conversion circuitry (e.g., A/D and D/A converters) so as to receive and quantify sensor input signals from various sensors in the machine 102, as well as to provide control output or drive signals to the various actuators therein. For instance, the control system 130 receives sensor input signals 122$a$, 131$a$ 135$a$, 138$a$, 139$a$, and 140$a$ from motor drives 122 and 131, a ram position sensor 135, pressure sensors 138 and 139, as well as from a clamp system 140. The control system 130 derives a current machine state 150 (e.g., such as a state vector) from one or more of the sensor signals 122$a$, 131$a$ 135$a$, 138$a$, 139$a$, and 140$a$, as illustrated and described further hereinafter with respect to FIG. 5.

Figure 7:
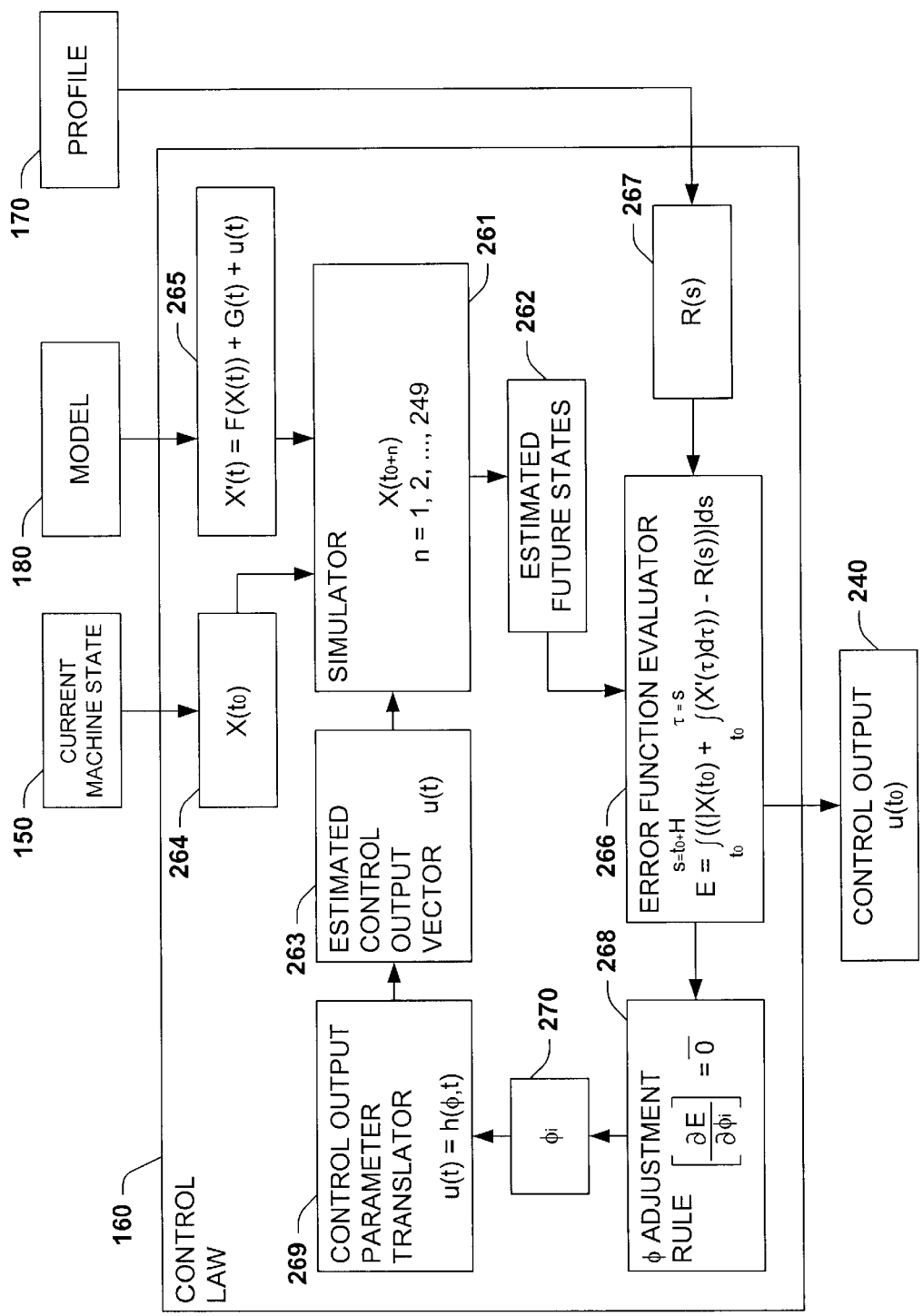
FIG. 7 is a schematic diagram illustrating an exemplary control law in accordance with the present invention.

The current machine state 150 is generated and updated in each control cycle of the control system 130, and is provided to or is accessed by a control law 160. For example, the current machine state 150 may be stored as an array or a state vector in memory or a data store in the control system 130, which may be accessed as needed by the control law 160 and periodically updated with new sensor input information every control cycle period (e.g., 1 ms). The control law 160 receives or accesses a profile 170, such as a series of desired future velocity states associated with the ram 114, which comprises or is otherwise derived from user-defined velocity values obtained from a user interface 132 in the control system 130. The control law 160, as illustrated and described in greater detail hereinafter with respect to FIG. 7, provides one or more control output signals or values to various actuators in the machine 102 based on the current machine state 150 and estimation of future states using a proposed control output vector and a model 180 of the machine 102 or a portion thereof.

For instance, the control law 160 provides a control output signal 137 to the control valve 125 in order to achieve longitudinal translation of the screw ram 114 in the direction of arrow 142 in the barrel 115 during an injection cycle. In addition, the control law 160 of the control system 130 provides control output signals 122$b$, 131$b$, and 140$b$ to motor drives 122 and 131, and the clamping system 140. Control system 130 may input other sensor signals and/or data from other devices via sensor inputs and network communications connections (not shown) apart from those illustrated and described herein, which may be used for constructing the current machine state 150, updating the machine model 180 or the profile 170, and may also provide output information (e.g., control output values, diagnostic information, etc.) to actuators and other devices not specifically illustrated herein, via signal lines and/or communications mediums (not shown).

The model 180 comprises one or more differential equations representative of the behavior (e.g., static and dynamic) of the injection molding machine 102, or portions thereof, as illustrated and described in greater detail hereinafter with respect to FIG. 6. In the exemplary control system 130, the control law 160 comprises one or more software objects or components in an object-oriented software system operating in the PC based hardware platform. The profile 170 and the current machine state 150 may be saved in a memory data store in the system 130 for access thereto and updating by external influences (e.g., via user interface 132) and/or by process related influences (e.g., via sensor input values). In addition, the profile and/or the current machine state may be operated on and/or otherwise accessed by various software objects in the control system 130 (e.g., such as the control law 160). Although the exemplary control system 130 is structured as an object-oriented software implementation, other implementations in hardware, software, and/or combinations thereof are contemplated as falling within the scope of the present invention.

Figure 3:
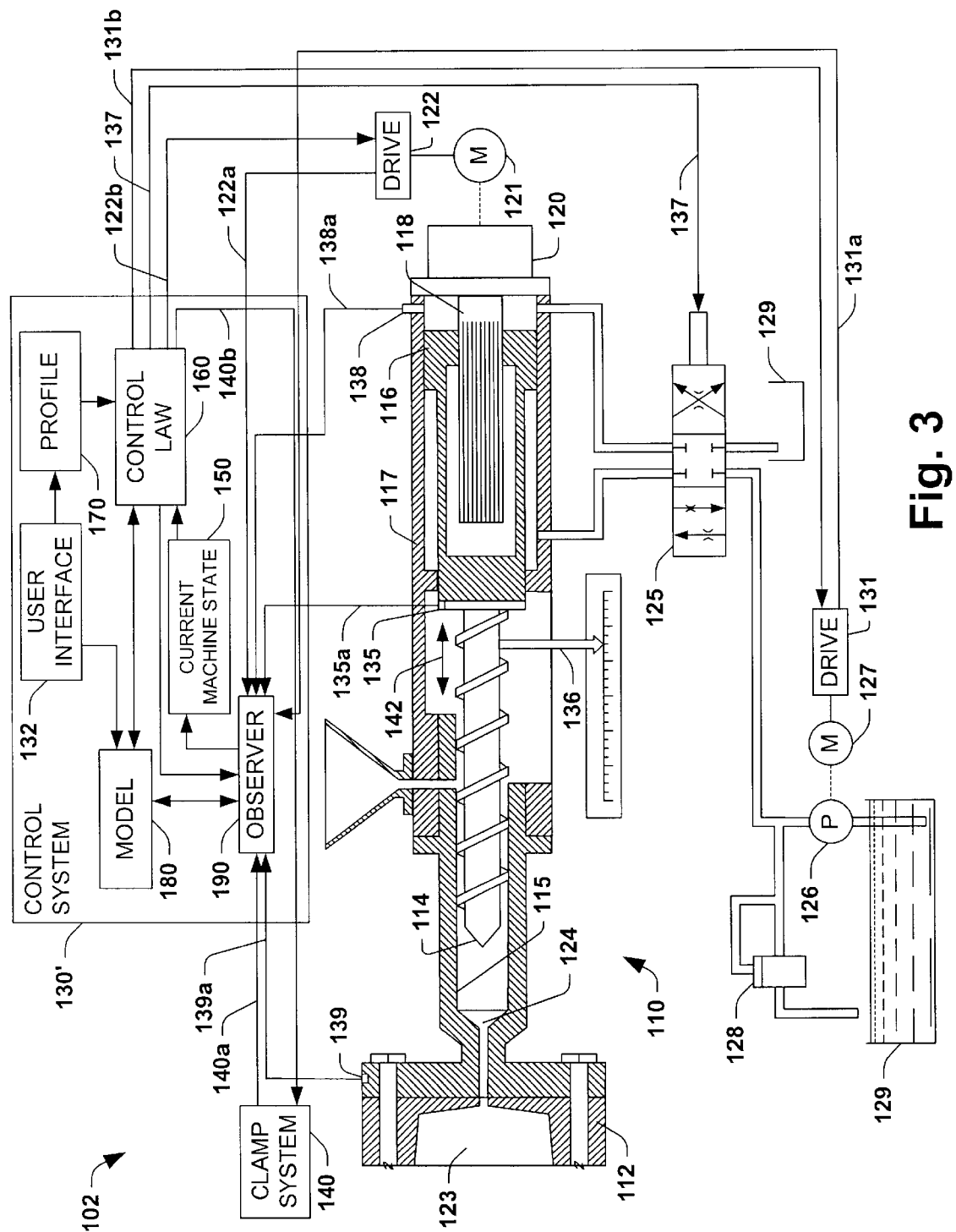
FIG. 3 is a partial side elevation view in section illustrating the injection molding machine of FIG. 2 with another exemplary control system in accordance with the invention.

Referring now to FIG. 3, another exemplary implementation of the injection molding machine 102 is illustrated, wherein a control system 130' comprises an observer component 190 in addition to a user interface 132, current state 150, control law 160, profile 170, and model 180 as described above. As discussed further hereinafter, the observer 190 receives input sensor values (e.g., sensor signals 122$a$, 131$a$, 135$a$, 138$a$, 139$a$, and/or 140$a$), and provides the current machine state 150 therefrom using the model 180 and the control law 160. In this manner, the observer 190 may provide the current machine state 150 indicative of various physical states of the machine 102, including one or more values representative of states which are not directly measured in the machine 102. The exemplary observer 190, moreover, may be a software component or object running in a PC based hardware platform of the control system 130', or may be implemented in any appropriate hardware or software or combinations thereof in accordance with the invention.

An exemplary observer software implementation is provided below, in which source code in C language is illustrated, and which may be compiled and run in an object-oriented system, such as a PC-based control system hardware platform 130'. The observer 190 may comprise one or more components or objects, each directed to observing states related to a sub-system in the machine 102, such as the hydraulic actuation of the ram 114. For instance, the observer code below is operable to provide current state information related to several hydraulic components within the machine 102 based on sensor input information from the position sensor 135 and the hydraulic cylinder pressure sensor 130 of FIG. 3. The operation of this portion of the machine 102 will be further illustrated and described hereinafter with respect to FIG. 8:

```
#DEFINE GPMPERCUINPERSEC 0.25974026
// Multiply by to convert to gpm
FUNCTION VIRTUAL GLOBAL Observer::Observe
VAR
    area : REAL;
    C : Real;
    END_VAR
    // Get Directly readable data
    pos := sPos.ddata;
    pr2 := sPress.ddata;
    p2prime := fPrsROC.ddata;
    // Determine cylinder area based on direction
    if ( sVel.ddata > 0 )
    then
        area := 3.141592654 * abore**2 / 4;
    else
        area := 3.141592654 * (abore**2 - arod**2) / 4;
    end_if;
    // Scale and read other readable data
    q3 := sVel.ddata / area * GPMPERCUINPERSEC;
    q3prime := fAccel.ddata / area * GPMPERCUINPERSEC;
    spvel := FlowValve.ddata;
    C := lookup( av, spvel );
    // Now calculate additional variables, 3 cases
    //
    // CASES 1 and 2: Proportional pressure relief valve is closed
    // so flow through XH is known from observed motion,
    therefore
    // pump pressure can be calculated. Pump relief may be open
    (CASE 2).
    //
    if ( pr2 < uprs )
    then
        q2 := q3 + c2 * p2prime;
        pr1 := pr2 + q2**2 / lookup( av, spvel )**2;
        fl := pr2 - mass * (q3prime / area - mu);
        if ( pr1 < pmax ) then
            // full flow should be going to cylinder
            p1prime := p2prime + 2 * q2 * q2prime /
            lookup( av, spvel )**2 + q2**2
            / lookup( av, spvel ) * lookupDeriv( av, spvel ) * aspool *
            ( uvel − spvel
            );
            q1 := lookup( gpm, pr1 );
            fq := q2 − q1 − c1 * p1prime;
        else
            // Pump pressure exceeded so use pmax, and pressure delta
            // to calculate flow
            pr1 := pmax;
            p1prime := 0;
            q1 := lookup( gpm, pr1 );
            fq := q2 − lookup( av, spvel )* sqrt( pr2 − pr1 );
        end_if
    //
    // CASE 3: G valve open, full flow through XH,
    but an unknown
    // amount going over G, so use p vs. q characteristics
    of G valve
    // to estimate.
    else
        q1 := lookup( gpm, pr1 );
        q2 := q1 − c1*p1prime;
```
-continued
```
        pr1 := pr2 + q2**2 / lookup( av, spvel )**2;
        p1prime := p2prime + 2 * q2 * q2prime /
        lookup( av, spvel )**2 + q2**2 /
        lookup( av, spvel ) * lookupDeriv( av, spvel )
        * aspool * ( uvel − spvel);
        fl := pr2 − mass * (q3prime / area − mu);
        fq := q2 − q3 − c2*p2prime − lookupInv( ag,
        (pr2 − uprs) );
    end_if
END_FUNCTION //VIRTUAL GLOBAL Observer::Observe
```

Figure 4:
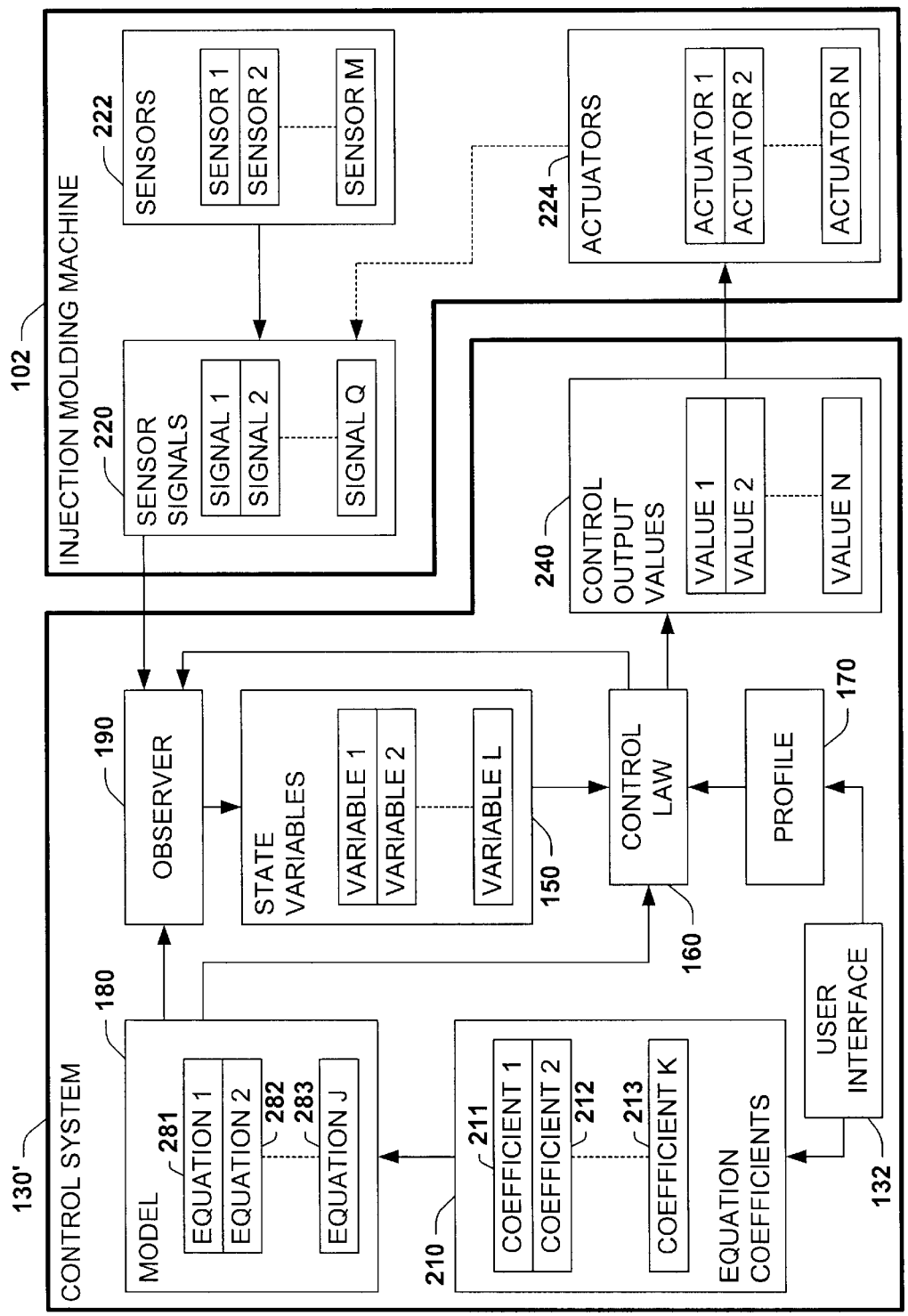
FIG. 4 is a schematic diagram further illustrating details of the control system of FIG. 3.

Further details of the exemplary control system 130' are illustrated in FIG. 4, wherein the model 180 comprises an integer number "J" equations 281, 282, through 283, one or more of which may be differential equations. The equations 281, 282, through 283 of the model 180 represent various behavior characteristics of the exemplary injection molding machine 102, using equation coefficients 210 specific to the machine 102, wherein individual coefficients 211, 212, through 213 may be provided via the user interfaced 132, and/or may be derived through other means. Coefficients 210, for example, may represent physical characteristics of the machine 102 or components thereof, such as mass, inertia, coefficients of friction, orifice sizes, or other physical properties. These coefficient values 210 may be estimated for a given machine, and/or may be derived using a parameter identification procedure.

For instance, a known series of commands or control output values 240 may be output from the control system 130' to the machine 102 in an off-line situation, and the various sensor input values 220 can be recorded. A cost function, for example, an integrated absolute error function may then be employed to determine the difference between an expected reaction of the model 180 (e.g., using the known values 240 and a particular set of coefficients 210), and the actual (e.g., measured) machine response. The cost function provides a metric or value indicative of how well the current coefficients 210 correlate with the actual measured response, and a minimization rule can then be employed so as to adjust the coefficients 210 to better match the machine 102.

The coefficients 210 and the model equations 281–283 are stored in a data store in the memory of the control system 130', whereby access thereto by various software or hardware components in the system 130' is facilitated. In particular, the model 180 may be accessed by the control law 160 in order to simulate estimated future machine states by solving some or all of the equations 281–283 using the current state 150 and an estimated set or vector of control output values.

In addition, the observer 190 may access the model 180 in order to provide the current machine state variables 150. The observer 190 inputs an integer number "Q" of sensor input signals 220 derived from various sensors 222 and/or from actuators 224 in the machine 102, and provides the current state variables 150 in the form of a current state vector comprising one or more values, which is in turn used by the control law 160 in determining an integer number "N" control output values in the form of a control output vector 240. The control output values 240 are then provided to actuators 224 in the machine 102 so as to effect a desired operation thereof. For instance, in addition to controlling various other motions or pressures in the machine 102, the control law 160 may provide a control output value 137 (FIG. 3) in order to operate the control valve 125 to effectuate a desired ram velocity, wherein the observer reads the ram position sensor signal 135a and the pressure signal 138a, and provides state variables in the vector 150 indicative of the position, velocity, and/or acceleration of the ram screw 114, as well as pressures and flows in the various hydraulic hoses or lines associated with the control valve 125. In this fashion, the control system 130' controls the motions of one or more components in the machine 102.

Figure 8:
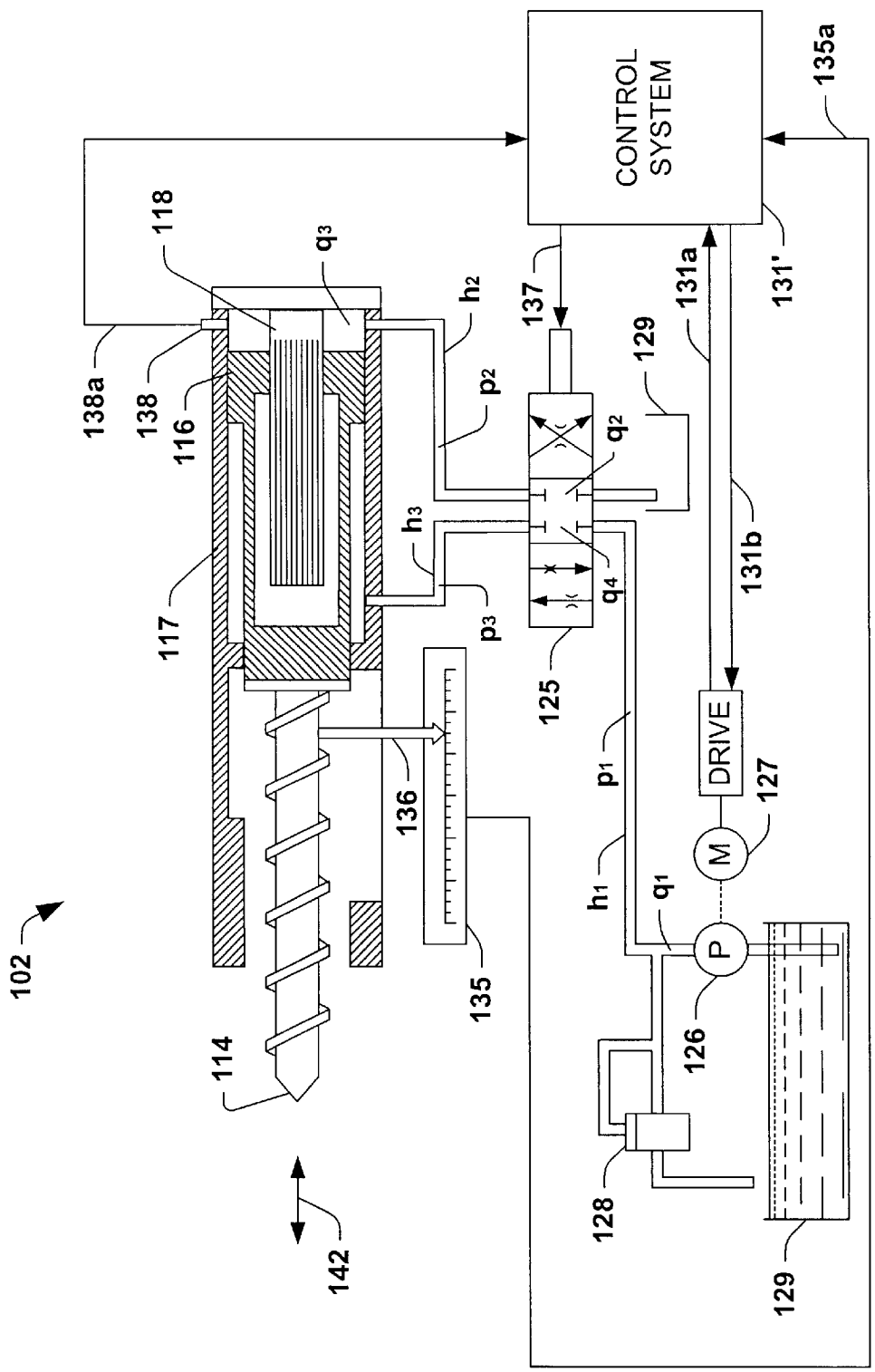
FIG. 8 is a partial side elevation view in section illustrating further details of a hydraulic ram positioning system with the molding machine of FIG. 3.

Referring now to FIGS. 5–8, the hydraulic apparatus used to actuate linear translation of the ram screw 114 in the machine 102 will now be referenced in order to further illustrate several aspects of the exemplary control system 130'. In particular, as illustrated in FIG. 8, the hydraulic components used to provide longitudinal translation of the ram 114 in the machine 102 are illustrated, together with various flows $q_1$, $q_2$, $q_3$, and $q_4$, and pressures $p_1$, $p_2$, and $p_3$ associated therewith. In FIG. 5, details of a portion of the current machine state 150 corresponding to the hydraulic ram translation sub-system are illustrated. The current state vector or machine state 150 comprises a plurality of state values s, $q_1$, $q_2$, $q_3$, $q_4$, $p_1$, $p_2$, $p_3$, $q_1'$, $q_2'$, $q_3'$, $q_4'$, $p_1'$, $p_2'$, $p_3'$, sp, $F_p$, and $F_q$, which represent a current state of the injection molding machine 102 with respect to the hydraulics of FIG. 8. The current state 150 also comprises other state variables relating to other component and sub-system states in the injection molding machine 102, but are omitted in FIG. 5.

FIG. 6 illustrates an exemplary model 180 having a plurality of state equations representative of behavior of the injection molding machine 102. The model broadly provides state equations in the form of the following equation (1):

$$\overline{X}(t) = F(\overline{X}(t)) + G(t) + u(t), \qquad (1)$$

representing the rate of change of the state values X(t) as a function "F" of the current state, plus a disturbance function G(t) and the current control output vector values u(t). In particular, the equations E1 through E15 in FIG. 6 represent the modeled behavior of the portion of the machine 102 illustrated in FIG. 8, as relates to the hydraulic longitudinal actuation of the translating ram screw 114. In the illustrated example equations E1 through E13, and the current machine state 150, "s" is the position of the ram screw 114 in the direction of arrow 142, $q_1$–$q_4$ are the hydraulic fluid flows indicated in FIG. 8, $p_1$–$p_3$ are the pressures in FIG. 8, $q_1'$–$q_4'$ and $p_1'$–$p_3'$ are the rates of change of the flows and pressures, sp is the spool position of the control valve 137, $F_p$ is a load disturbance and $F_q$ is a flow disturbance.

The various coefficients (e.g., coefficients 210 of FIG. 4) indicated in the exemplary equations E1–E15 of FIG. 6 represent various physical characteristics of the machine 102, and may be determined empirically and/or may be derived from CAD data for the various machine components. For instance, $C_1$–$C_3$ represent the fluidic capacitances of the hoses $h_1$, $h_2$, and $h_3$ associated in FIG. 8 with the pressures $p_1$–$p_3$, respectively. "$a_0$" is the pump pressure flow curve associated with the pump 126 and "$a_1$" is the hydraulic cylinder bore area ratio from rod end to bore end for the cylinder 117. $A_1(v)$ is entrance side orifice area for the control valve 125, $A_2(v)$ is exhaust side orifice area for the control valve 125, and "v" is the voltage applied to the valve 125 via the control output signal 137 from the control system 130'. Other such equations (not shown) in the model 180 correspond to other sub-systems and components and the behavioral characteristics thereof in the exemplary machine 102.

FIG. 7 illustrates further details of the exemplary control law 160 in the control system 130'. The control law 130' estimates future machine states according to a proposed control output vector 263, the current machine state 150 and the model 180 of the machine, and recursively refines the control output vector 263 using an error function and an adjustment rule 268 in order to reduce the error between the estimated future machine states and desired future machine states R(s) 267. The current machine state 150 may be provided by the observer 190 using the model 180 and current machine sensor signals, by which the number of required sensors can be reduced. Alternatively (e.g., as in the control system 130 of FIG. 2), the current state 150 may be provided based solely on sensor signal inputs. One or more control outputs 240 are then provided to actuators 224 (e.g., FIG. 4) associated with the machine 102 according to the refined proposed control output vector 263 from the control law 160.

The simulator component 261 in the exemplary control system 130' is a software component or object running on the hardware platform of system 130', which operates to simulate a plurality of estimated future states 262 of the injection molding machine 102 according to a proposed control output vector 263 having a plurality of control output values representative of control outputs 240 at a current time and at future times using the current state vector $X(t_0)$ 264 from the current machine state 150 and the model 180. For example, one of the control output values in the proposed control output vector 263 is a voltage signal value adapted for provision to the hydraulic control valve 125. The simulator 261 is operative to solve the differential equations of the model 180 using the proposed control output vector 263 and the current state vector 150. For instance, the exemplary simulator component 261 of the control law 160 employs one or more numerical techniques, such as a Runge-Kutta method or difference equation techniques, in order to solve the equations 265 from the model 180, to simulate the estimated future states 262.

The control law 160 further comprises a cost or error function evaluator 266 operative to determine an error E between the estimated future states 262 and the desired future states R(s) 267 from the user-defined profile 170. In the illustrated example, the profile 170 comprises a velocity versus time profile for the longitudinal translation of the ram 114, and the desired future states R(s) 267 may be derived therefrom. The error E thus is indicative of the appropriateness of the proposed control output vector u(t) 263 initially provided by the control law 160. As pointed out below, the initial proposed control output vector u(t) 263 may be derived from a final (e.g., refined) control output vector from a previous control cycle, whereby the error E may be reduced and the recursive control output refinement of the control law 160 may be enhanced.

The control law 160 also comprises an adjustment rule 268 operative to adjust or refine the proposed control output vector 263 according to the error E, a control output function u(t)=h($\phi$,t), shown as a control output parameter translator 169, wherein the adjustment rule 268 generates or correlates a plurality of coefficients $\phi_i$ 270 from the proposed control output vector 263 according to the control output function u(t)=h($\phi$,t), and evaluates a plurality of partial differential equations [$\partial E/\partial \phi_i$] for error with respect to the plurality of coefficients $\phi_i$. Other implementations of adjustment rules are contemplated as falling within the scope of the present invention, for example, wherein a single refinement of the proposed control output vector is accomplished by an adjustment rule 268 which performs an inverse operation to obtain a refined control output vector, which can then be provided as the current control output u(t) 240, particularly where the machine 102 (e.g., or the subsystem thereof being controlled) is somewhat linear.

In the exemplary implementation illustrated herein, $u(t)=h(\phi,t)$ is a function provides an output value $u(t)$ for any given time t, based on eight parameters $\phi_i$ forming a vector $\phi$. The eight parameters $\phi_i$ are the coordinates of four pairs of points of $u(t)$ at t, wherein the value of $u(t)$ between any of the pairs of points is a linear interpolation between the points. Thus, the eight values for $\phi$ may be used to represent 250 values of $u(t)$, wherein less computational resources are needed for minimization of the error E. The coefficients $\phi_i$, are adjusted using numerical techniques so as to reduce the error E in the control law 160, wherein the control output parameter translator 269 thereafter translates the adjusted coefficients $\phi_i$ according to the control output function $u(t)=h(\phi,t)$ to provide the refined proposed control output vector $u(t)$ 263. For example, one implementation of the exemplary control law 160 employs a conjugate gradient technique to adjust the values of the coefficients $\phi$, although other techniques can be employed within the scope of the invention, for example, such as variable metric optimizations, or the like.

In accordance with the present invention, the control law 160 recursively refines the proposed control output vector 263 using the adjustment rule 268, to simulate refined estimated future states 263 using the simulator 261, and determines a refined error E between the refined estimated future states 262 and the desired future states R(s) 267 until a termination condition occurs. For example, the exemplary control law 160 ends the refinement process when either a predetermined time elapses (e.g., so as to ensure output of a control output vector to the machine 102 before the end of the current control cycle), a predetermined number of iterations occurs (e.g., so as to avoid endless loops), until the most recently refined error E is found to be less than a predetermined threshold value, or until the rate of change of the error E is less than a threshold.

Once one of these termination conditions is met, the control law 160 provides a control output $u(t_0)$ 240 to the actuators 224 (FIG. 4) in the injection molding machine 102 according to the most recently refined proposed control output vector 263. In this regard, the proposed control output vector may comprise an array or matrix of control output vectors, wherein each column vector comprises a plurality of control output values 240 individually destined for a particular actuator 224 in the machine 102, and wherein each row of such vector represents the estimated control output values at a given time. Thus, individual control output vectors in such an array 263 may be provided for a number of control cycles from the current time $t_0$ through a time window (e.g., or horizon) of a number of control cycles, such as 250. As indicated above, the control law 160 may save at least a portion of the most recently refined proposed control output vector 263 (e.g., the 249 future time proposed control output vectors of the array of 250 such vectors) for use in future control cycles as an initial estimate. For instance, in a subsequent control cycle, the control law 160 may provide a first proposed control output vector 263 as an initial "seed" according to a previously saved proposed control output vector 263 from a previous control cycle for the recursive refinement process of the invention. Alternatively, the smaller set of coefficients $\phi_i$, or a portion thereof, may be saved for use in subsequent control cycles, rather than saving the larger set of $u(t)$ values (e.g., or a portion thereof).

FIGS. 9a through 12b provide an illustration of the recursive control output optimization capabilities of the exemplary control system 130' in the context of controlling the longitudinal translation of the ram 114 according to a user-defined pressure versus time profile (e.g., such as profile 170). FIG. 9a shows a graph 400 with a pressure profile 402 corresponding to a series of desired melt pressures p(t) associated with the longitudinal motion of the ram 114 during an injection stroke in the machine 102. The graph 400 further illustrates an actual pressure curve 404 through time $t_0$. FIG. 9b illustrates a corresponding graph 406 with a control output curve $u(t)$ 408 through $t_0$. The illustrated control output $u(t)$ 408 represents the control signal 137 applied to the control valve 125 in FIG. 8, resulting in the actual pressure p(t) 404 through time $t_0$, which closely approximates the desired pressure profile curve 402. Referring also to FIG. 4, at each control cycle, such as at time $t_0$, the observer 190 uses the physical model 180, along with the sensor input signals 220 to estimate the internal states for the molding machine 102.

The portion of the model 180 relating to the hydraulic components of FIG. 8 (e.g., equations E1 through E15) are used by the observer 190 to estimate the states of the current state vector 150 representing the pressures and flows through the valve 125 and the hose sections h1–h3, based on the ram position signal 135a from the sensor 135 and the pressure sensor signal 138a, wherein the observer 190 may employ predictions using the model 180, together with appropriate differentiation and/or integration of the various sensor signals (e.g., to obtain current velocity from position information), for instance, using digital filtering and backward propagation of observed errors. The control law 160 is then employed to calculate a control output signal 137 which results in a pressure which best matches the desired trajectory 402. The control law 160 implements a variation of a receding horizon technique along with an optimized recursive shooting method, by which non-linear machine systems and models having complex modes of energy storage may be simulated.

Figure 10A:
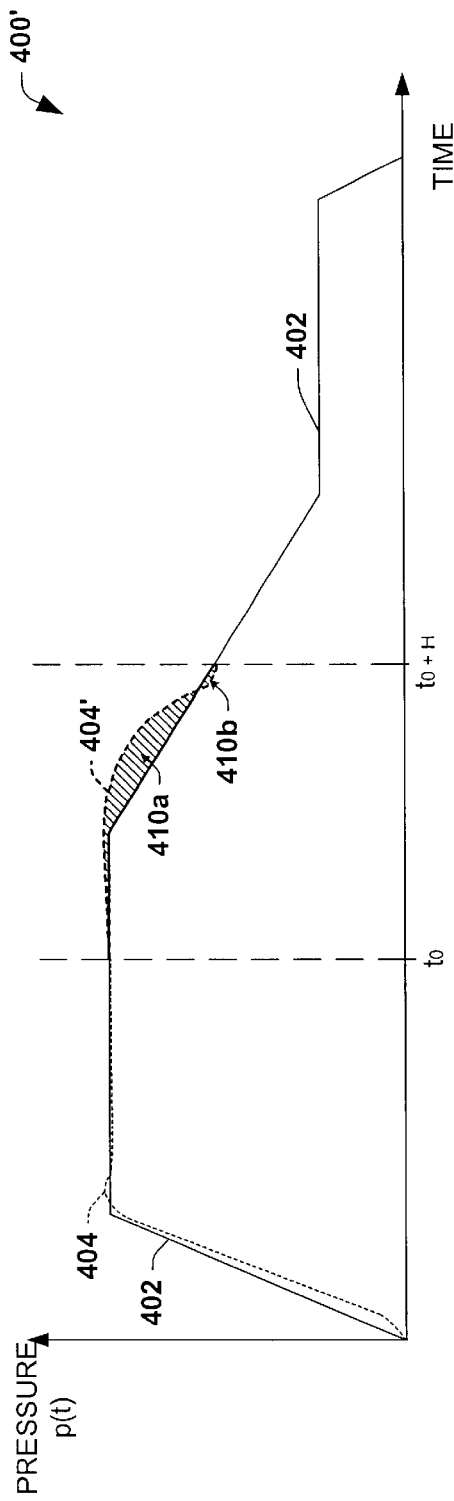
FIGS. 10a and 10b illustrate the graphs of velocity and control output of FIGS. 9a and 9b, respectively, further including estimated future velocity states corresponding to an initial proposed control output vector, together with the corresponding velocity error in accordance with the invention.
Figure 10B:
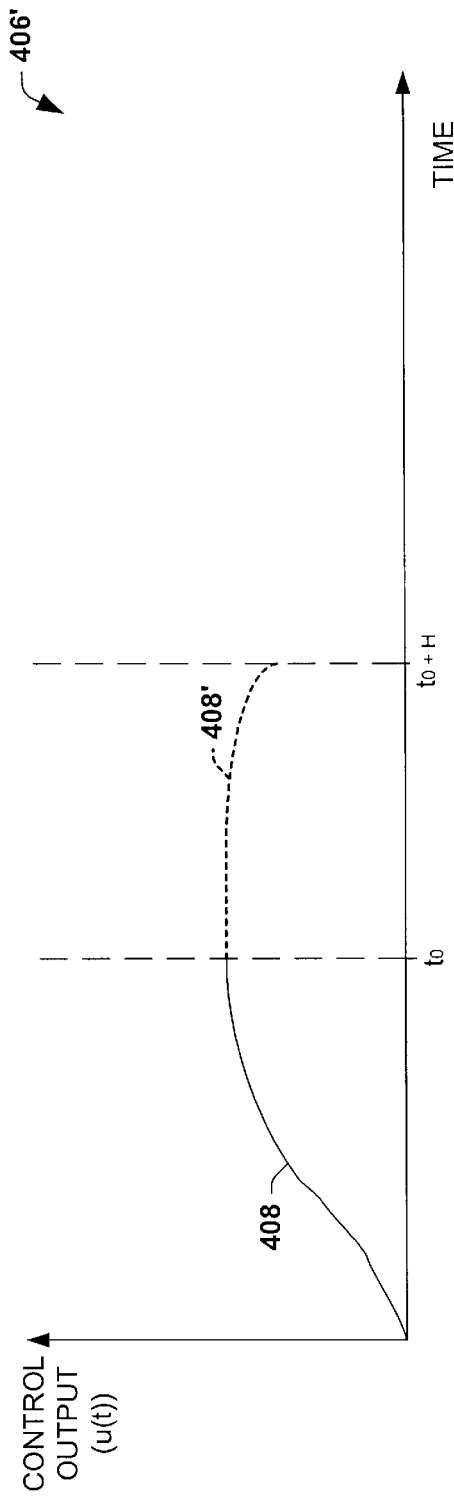

The control system 130' operates to input sensor information 220 and output control output signals 224 at 1 ms control cycle intervals. At each control cycle (e.g., such as at current time $t_0$ in FIGS. 9a and 9b), the model 180 is iteratively advanced from the current state (e.g., as provided by the observer 190) for a horizon time period H (e.g., 250 control cycles or 250 ms) using a proposed control output vector $u(t)$ 263 (FIG. 7). Referring also to FIGS. 10a and 10b, an initial estimated control output 408' is illustrated in FIG. 10b extending from the current time $t_0$ to $t_0+H$. Although the illustrated example employs a horizon time period H of 250 control cycles, other horizons are possible within the scope of the present invention. For instance, the horizon H may be selected so as to estimate or simulate past the response times of the sub-system of machine 102 of interest, while conserving computational resources.

The proposed control output vector 263 may be defined as a function of a limited set of coefficients $\phi_i$ 270 using a control output function $u(t)=h(\phi,t)$, and may be initially derived from previously stored estimated control outputs from a previous control cycle. The corresponding pressure p(t) 404' resulting therefrom is simulated by the control law 160 using the model 180 and the current state 150. The difference between the estimated future pressures 404' and the desired pressures (e.g., along the profile 402) is illustrated in FIG. 10a as an area 410, which may comprise more than one non-contiguous portions 410a and 410b over the horizon period H (e.g., current time $t_0$ through $t_0+H$). Thus, the error function evaluator 266 of the control law 160 provides an error indication E representing the quality of the initial estimated control output signal $u(t)$ 408'.

The control output coefficients $\phi_i$ 270 are then refined according to the adjustment rule 268, using a conjugate gradient method, as illustrated and described in greater detail hereinafter with respect to FIG. 13. As shown in FIGS. 11a and 11b, a refined estimated control output u(t) 408" is then used to simulate a refined estimate of the future ram pressure 404" using the current state 150 and the model 180, wherein the pressure 404" more closely emulates the desired pressure trajectory 402 than did the previous estimated pressure 404' of FIG. 10a. As a result, the error area 410' (e.g., portions 410a' and 410b') is less than in the prior iteration. The control law 160 continues to recursively refine the proposed control output vector in this fashion until a predetermined number of iterations have been performed, a predetermined time has passed, or until the error E, or a rate of change thereof is less than a predetermined threshold value.

For example, a further iteration is illustrated in FIGS. 12a and 12b, wherein a further refined control output 408''' produces a second refined estimated pressure 404''', with a correspondingly smaller error area 410''. Once the iterative refinement ends, the portion of the final proposed control output vector which is related to the current time $t_0$ is then provided as the control output 240 to the molding machine actuators 224 (e.g., including a control signal to the hydraulic valve 125 to actuate the ram 114). The remaining portion (e.g., that related to times $t_0+1$ through $t_0+249$) are then stored for use in the next control cycle as the initial proposed control output vector 263. Alternatively, the most recently refined values of $\phi$ can be stored for use in subsequent control cycles. The reuse of estimated control output or $\phi$ values has been found to improve the machine performance by providing better estimates in fewer iterations than the case where the initial estimate for control output values is derived by other means.

Figure 13:
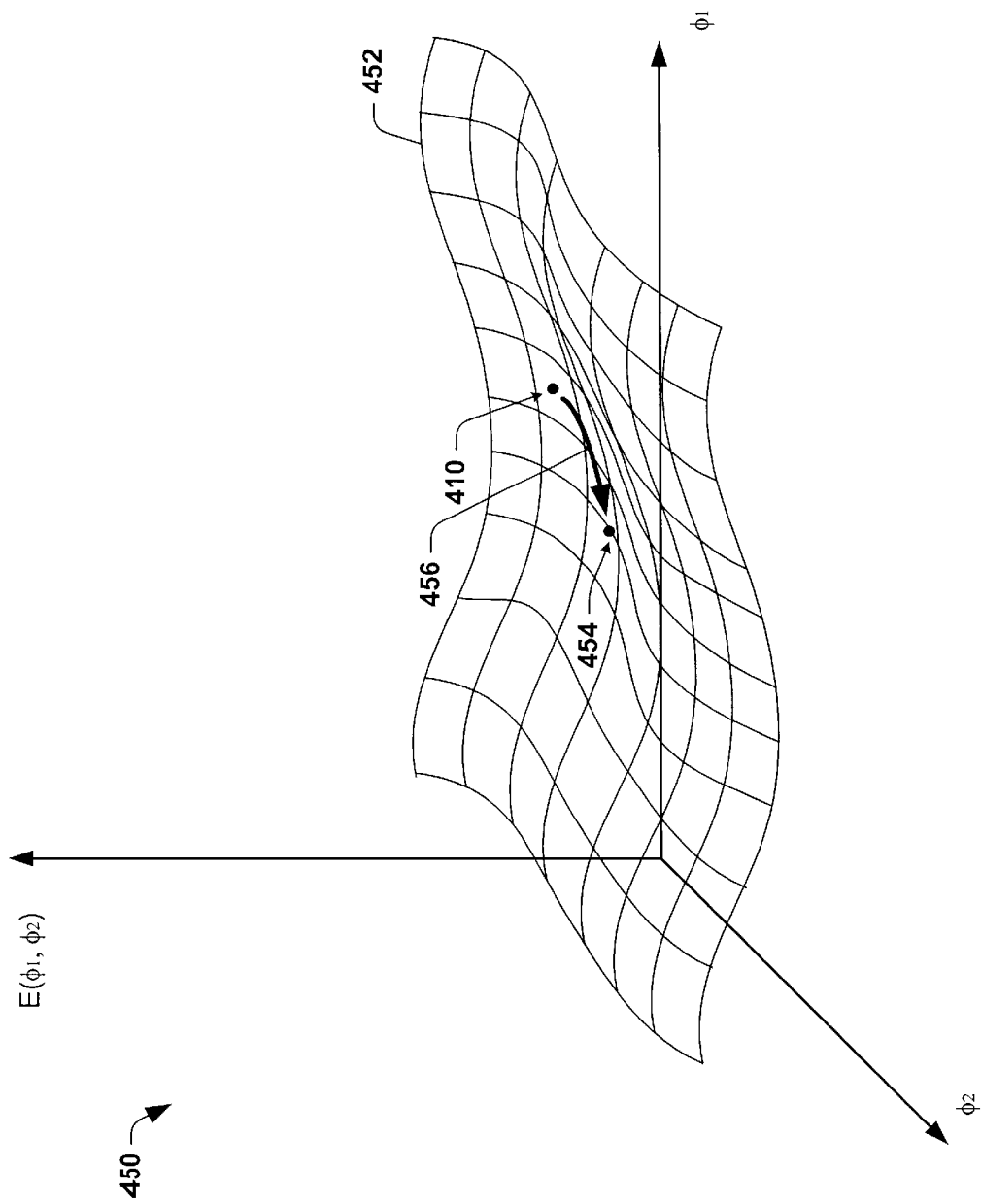
FIG. 13 is a three dimensional graph of error E with respect to two exemplary parameters $\phi_1$ and $\phi_2$, illustrating an exemplary adjustment rule using a conjugate gradient technique in accordance with the invention.

Referring also to FIG. 13, an exemplary three dimensional plot 450 is illustrated for two control output function coefficients $\phi_1$ and $\phi_2$ versus an error function E. In accordance with an aspect of the invention, the coefficients $\phi_1$ and $\phi_2$ are adjusted using the adjustment rule 268 by a conjugate gradient technique to minimize or reduce the error E. For example, one implementation of such a conjugate gradient minimization is the Newton-Ralphson method of successive approximation. As illustrated in FIG. 13, the error function E is a surface 452 having a local minima 454. Where the initial estimated error 410 (FIG. 10a) from the error function evaluator 266 is not located at the minima 454 on the surface 452, the adjustment rule 268 uses the conjugate gradient technique to adjust the values of $\phi_1$ and/or $\phi_2$ along the line 456 toward the minima point 454. The adjusted $\phi$ values are then used to derive a refined proposed control output vector fur use in the next simulation. In this manner the exemplary control law 160 recursively optimizes the control output values to reduce the error E, before sending a final refined control output vector to the actuators in the molding machine 102. It will be noted at this point that although the exemplary adjustment rule employs the conjugate gradient methodology, other adjustment techniques can be employed by which the error E may be reduced or minimized and which techniques are contemplated as falling within the scope of the present invention.

Figure 14:
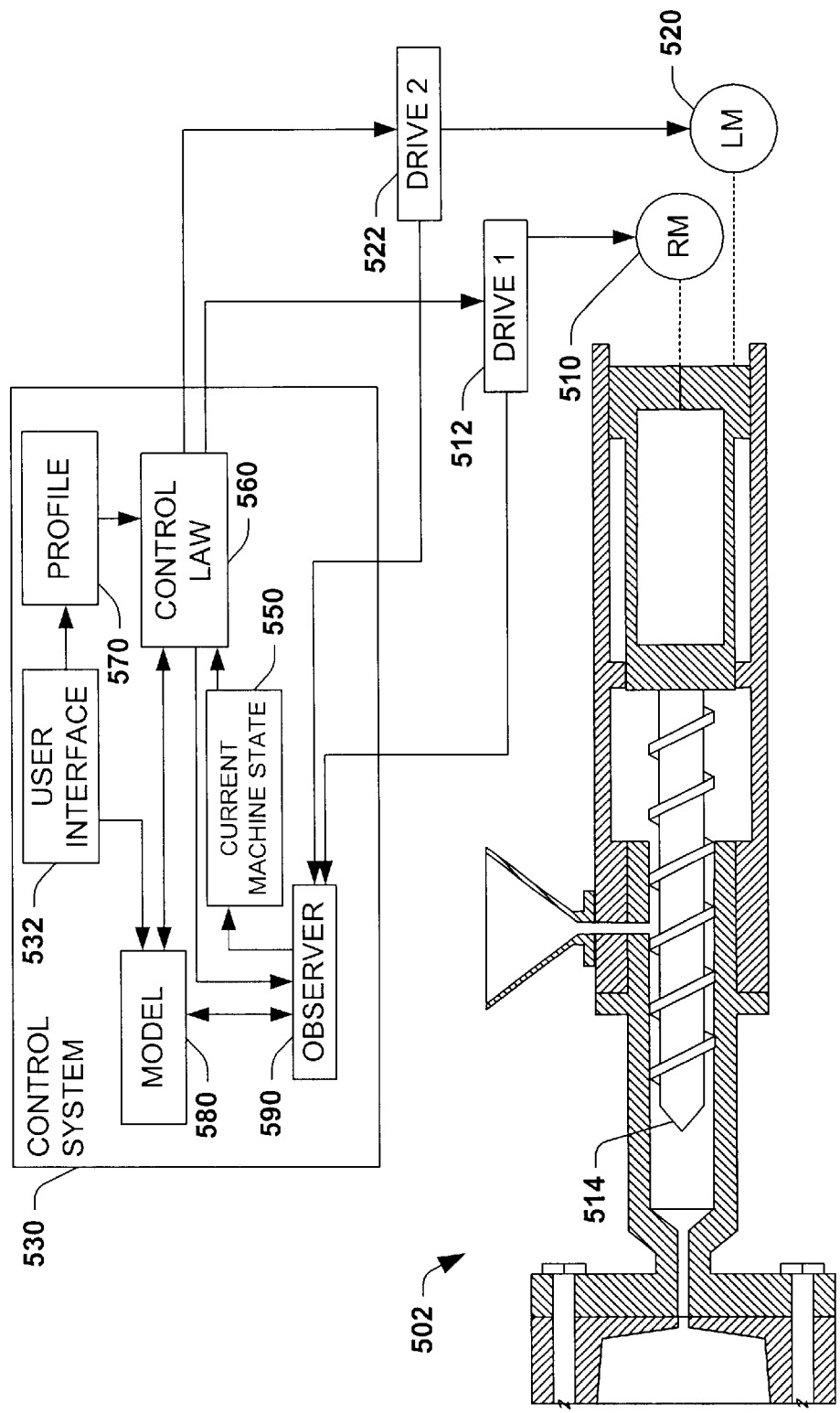
FIG. 14 is a partial side elevation view in section illustrating an injection molding machine with electric motor actuators for linear and rotational positioning of the ram, together with an exemplary control system in accordance with the present invention.

Referring now to FIG. 14, a portion of another exemplary injection molding machine 502 is illustrated in which various aspects of the invention may be carried out. Unlike the hydraulic machine 102 illustrated and described above, the machine 502 comprises electric motor actuation for translation and rotation of an injection ram 514. In particular, a rotary electric motor 510 is driven by a first motor drive 512 for rotating the ram 514, and a linear motor 520 driven by a second drive 522 provides translation of the ram 514 in a longitudinal direction during an injection stroke. A control system 530 is provided in accordance with the invention, which comprises a user interface 532 for receiving a ram velocity profile 570, a model 580 comprising equations representative of the behavior of the machine 502, an observer 590 providing a current machine state 550 according to the model 580 and inputs from the drives 512 and/or 522, and a control law 560. The components 532, 550, 560, 570, 580, and 590 of the control system 530 operate in similar fashion to the components 132, 150, 160, 170, 180, and 190 described above, whereby improved control can be achieved in an electric molding machine according to the various aspects of the invention.

Figure 15A:
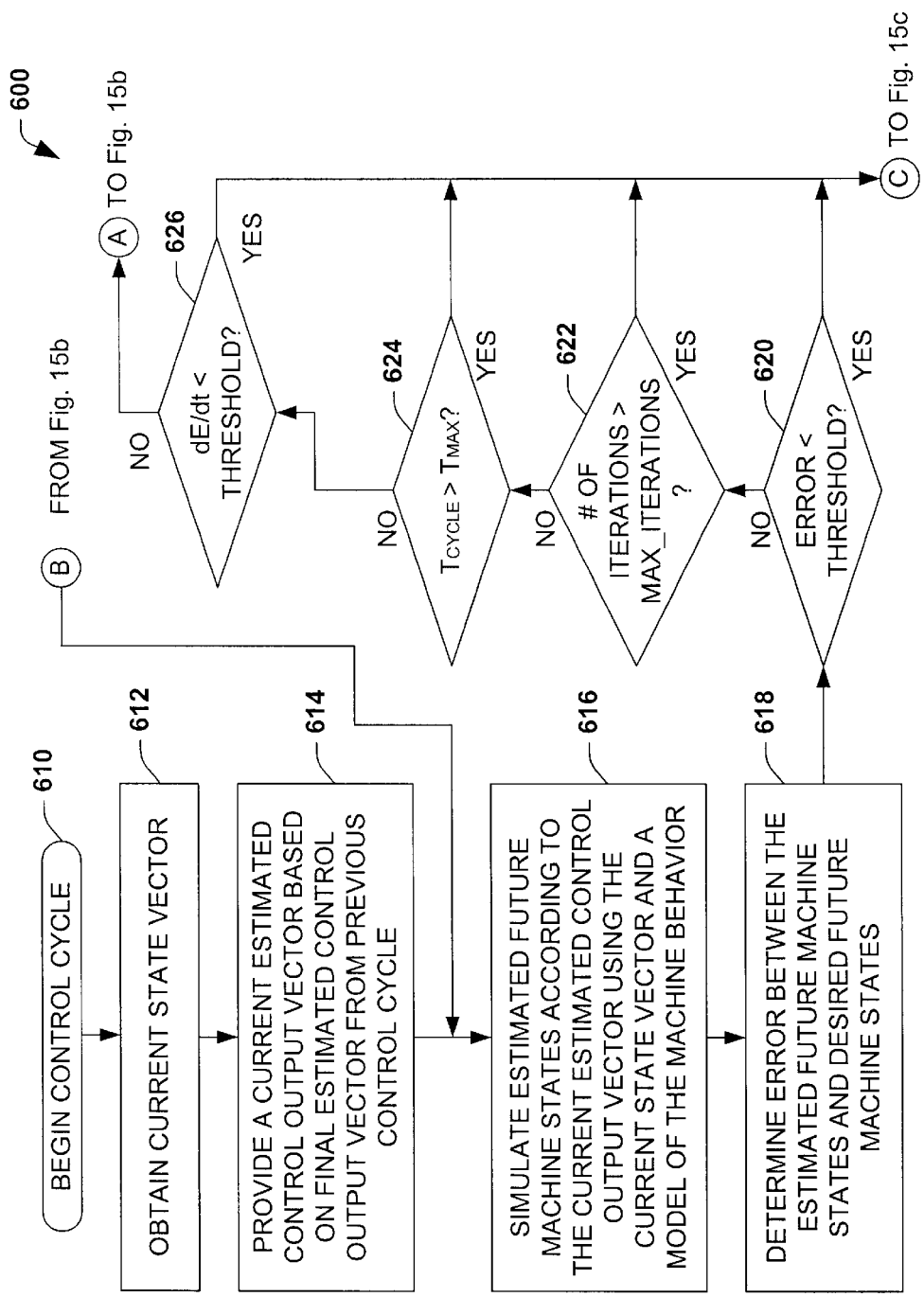
FIGS. 15a–15c are flow diagrams illustrating an exemplary method for controlling motion or pressure in an injection molding machine in accordance with another aspect of the present invention.
Figure 15B:
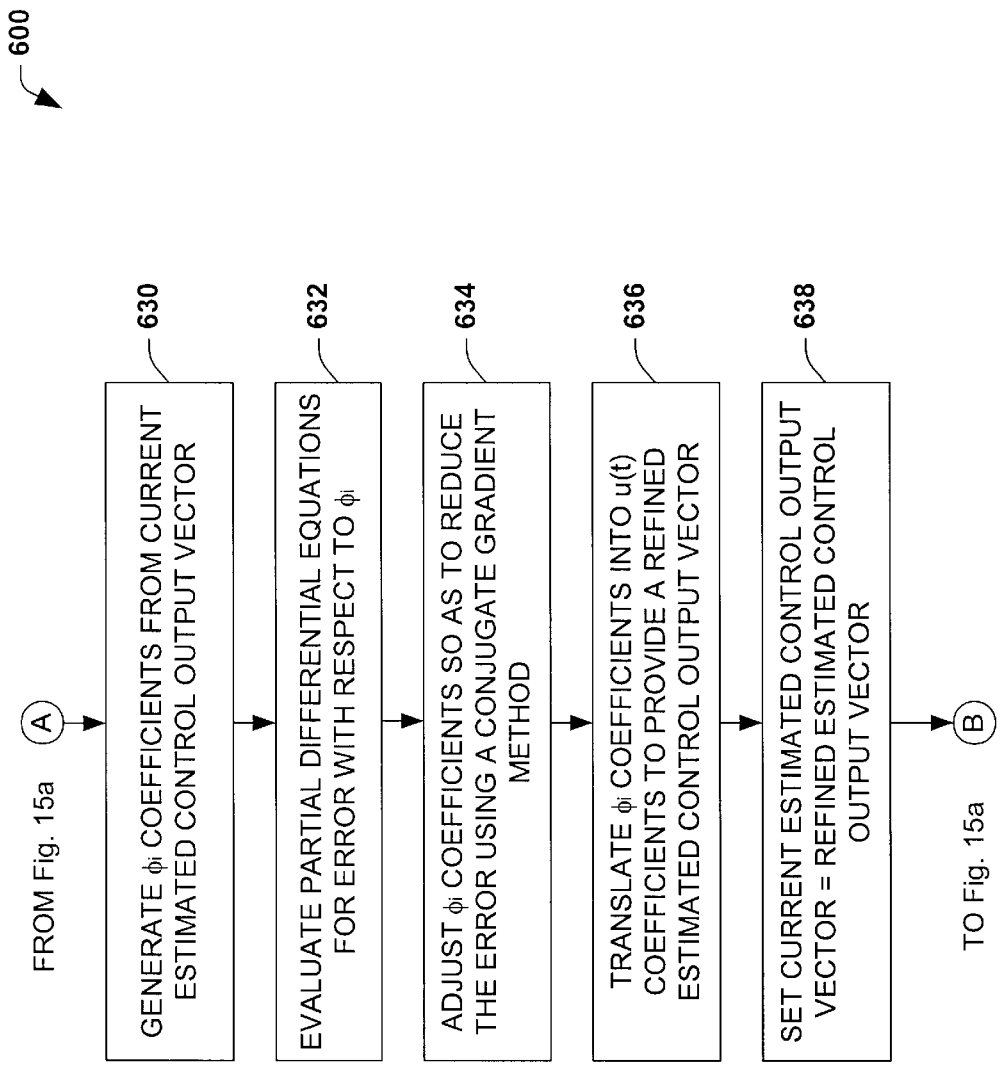
Figure 15C:
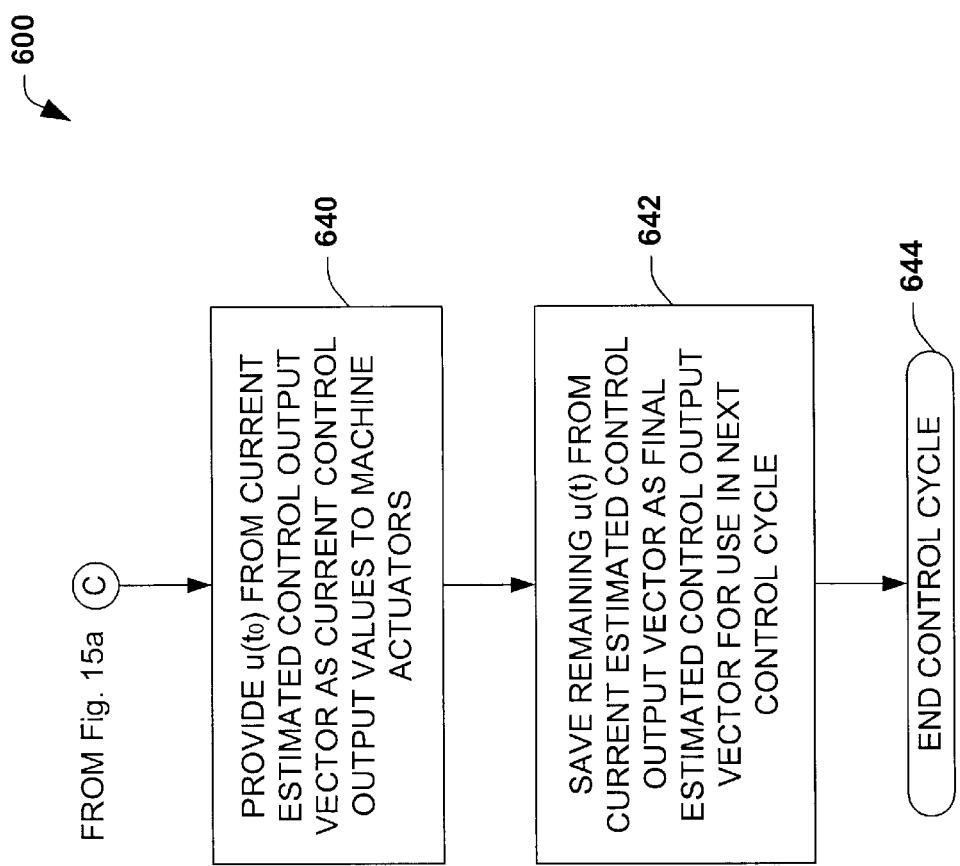

Another aspect of the invention provides methods for controlling motion and/or pressure in an injection molding machine. One such method 600 is illustrated in FIGS. 15a–15c in accordance with the invention. While the exemplary method 600 is illustrated and described herein as a series of acts or events, it will be appreciated that the present invention is not limited by the illustrated ordering of such acts or events, as some acts may occur in different orders and/or concurrently with other acts or events apart from those illustrated and/or described herein, in accordance with the invention. In addition, not all illustrated steps may be required to implement a methodology in accordance with the present invention. Moreover, it will be appreciated that the method 600 may be implemented in association with the apparatus and systems illustrated and described hereinabove as well as in association with other systems not illustrated. For example, the method 600 may be implemented using one or more software components or objects running on a PC based hardware control system platform.

The methodologies according to the invention comprise obtaining a current state vector having state values representative of a current state of a molding machine, and simulating estimated future states of the machine according to a proposed control output vector with control output values representative of control outputs at a current time and at future times using the current state and a model. An error is then determined between the estimated future states and desired future states, such as from a user-defined profile. The methods further comprise recursively refining the proposed control output vector according to an error between estimated future states and the desired future states, simulating refined estimated future states according to the refined proposed control output vector, and determining a refined error between the refined estimated future states and the desired future states until a termination condition occurs. Thereafter, a control output is provided to the molding machine according to the most recently refined proposed control output vector.

The exemplary method 600 of FIGS. 15a–15c begins at 610 for a given control cycle, and a current state vector is obtained at 612. The current state vector may be obtained directly from sensor inputs from sensors associated with the machine, or alternatively may be provided by an observer. In the latter case, the current state vector may be obtained at 612 by obtaining one or more sensor input value, and estimating the current state of the injection molding machine using a model and the sensor input values by computing one or more state values representative of a current state of the injection molding machine using the model, for example, using numerical techniques such as the Runge-Kutta method or difference equation techniques. The current state vector is then formed using the computed state values.

At 614, a current proposed control output vector is provided, which can be based on a final proposed control output vector from a previous control cycle. Thereafter at 616, estimated future machine states are simulated according to the current proposed control output vector using the current machine state vector and the model. Simulating the estimated future states may involve solving one or more differential equations from the model using the proposed control output vector and the current state vector, such as via a Runge-Kutta method and/or difference equation techniques. An error is determined at 618 between the estimated future machine states and desired future states. At 620, a determination is made as to whether the error is less than a threshold. If not, the method 600 proceeds to 622, whereat a determination is made as to whether a maximum predetermined number of iterations have been performed. If not, a determination is made at 624 as to whether a predetermined time $T_{MAX}$ has passed in the current control cycle, and if not a determination is made at 626 as to whether a rate of change of the error E is less than a threshold. If any of the determinations are true (e.g., YES at 620, 622, 624, or 626), the method proceeds to 640 in FIG. 15c, as described further hereinafter.

Otherwise, the proposed control output vector is refined as illustrated in FIG. 15b. At 630 in FIG. 15b, control output function coefficients $\phi_i$ are generated from the current proposed control output vector. At 632, partial differential equations are evaluated for error with respect to the coefficients $\phi_i$. The coefficients $\phi_i$ are adjusted at 634 so as to reduce the error, and at 636, the adjusted coefficients $\phi_i$ are translated according to a control output function to provide the refined proposed control output vector. In this regard, the adjustment of the coefficients $\phi$ at 634 may comprise adjusting one or more coefficients using a conjugate gradient method so as to reduce the error. The current proposed control output vector is then set to the refined proposed control output vector at 638, whereafter the method 600 returns to 616 of FIG. 15a to simulate a new set of estimated future machine states based on the refined control output vector, as described above. The method 600 proceeds in this fashion until one of the termination conditions is met at 620, 622, 624, or 626. At that point, the method 600 proceeds to 640 of FIG. 15c, where a control output $u(t_0)$ from the current proposed control output vector (e.g., following refinement) is provided as control output values to actuators in the molding machine. Thereafter at 642, the remaining (e.g., future) control output values u(t) from the final proposed control output vector are saved or stored for use in a subsequent control cycle, after which the method 600 ends for the current control cycle at 644.

The methodologies of the invention may be implemented in a variety of forms, including but not limited to software running in a computer system, programmable logic, firmware running in a microprocessor based control system, and other combinations of hardware and/or software. In this regard, the present invention contemplates computer-readable media having computer-executable instructions for implementing one or more of the methods of the invention, such as for example, the exemplary method 600 illustrated and described above with respect to FIGS. 15a–15c.

Although the invention has been shown and described with respect to one or more implementations, equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description and the claims, such terms are intended to be inclusive in a manner similar to the term "comprising."

What is claimed is:

1. A method for controlling motion or pressure in a non-linear injection molding machine, comprising:

obtaining a current state vector having a plurality of state values representative of a current state of said injection molding machine;

providing a proposed control output vector having a plurality of control output values representative of control outputs at a current time and at future times;

simulating a plurality of estimated future states of said injection molding machine according to said proposed control output vector using said current state vector and a model with a plurality of state equations representative of behavior of said injection molding machine;

determining an error between said plurality of estimated future states and a plurality of desired future states;

recursively refining said proposed control output vector according to an error between estimated future states and said plurality of desired future states, simulating refined estimated future states of said injection molding machine according to said refined proposed control output vector using said current state vector and said model, determining a refined error between said refined estimated future states and said desired future states until a termination condition occurs; and providing a control output to at least one actuator in said injection molding machine according to said most recently refined proposed control output vector.

2. The method of claim 1:

wherein providing a proposed control output vector comprises providing a first proposed control output vector having a plurality of control output values representative of control outputs at said current time and at future times;

wherein simulating a plurality of estimated future states comprises simulating a first plurality of estimated future states of said injection molding machine according to said first proposed control output vector using said current state vector and said model;

wherein determining an error between said plurality of estimated future states and a plurality of desired future states comprises determining a first error between said first plurality of estimated future states and a plurality of desired future states;

wherein recursively refining said proposed control output vector, simulating refined estimated future states and, determining a refined error comprises:

providing a first refined proposed control output vector according to said first error so as to reduce said first error;

simulating a first refined plurality of estimated future states of said injection molding machine according to said first refined proposed control output vector using said current state vector and said model;

determining a first refined error between said first refined plurality of estimated future states and said plurality of desired future states; and wherein providing said control output comprises providing a control output to said at least one actuator according to said first refined proposed control output vector.

3. The method of claim 2, further comprising:

providing a second refined proposed control output vector according to said first refined error so as to reduce said first refined error;

simulating a second refined plurality of estimated future states of said injection molding machine according to said second refined proposed control output vector using said current state vector and said model;

determining a second refined error between said second refined plurality of estimated future states and said plurality of desired future states; and providing said control output to said at least one actuator according to said second refined proposed control output vector.

4. The method of claim 3, further comprising saving at least a portion of said second refined proposed control output vector, wherein providing a first proposed control output vector comprises providing said first proposed control output vector according to a previously saved proposed control output vector from a previous control cycle.

5. The method of claim 3, wherein said termination condition comprises one of a predetermined time elapsing, a predetermined number of iterations occurring, said most recently refined error being less than a threshold value, and a rate of change of said most recently refined error being less than a threshold value.

6. The method of claim 3, wherein obtaining said current state vector comprises:

obtaining at least one sensor input value from a sensor associated with said injection molding machine; and estimating said current state of said injection molding machine using said model and said at least one sensor input value.

7. The method of claim 6, wherein estimating said current state of said injection molding machine comprises computing said plurality of state values representative of a current state of said injection molding machine using said model, and forming said current state vector using said computed state values.

8. The method of claim 7, wherein said model comprises at least one differential equation, and wherein computing said plurality of state values comprises solving said at least one differential equation according to one of a Runge-Kutta method and a difference equation technique.

9. The method of claim 3, wherein said model comprises at least one differential equation, and wherein simulating said plurality of estimated future states comprises solving said at least one differential equation using said proposed control output vector and said current state vector.

10. The method of claim 9, wherein solving said at least one differential equation comprises solving said at least one differential equation according to one of a Runge-Kutta method and a difference equation technique.

11. The method of claim 1, wherein said model comprises at least one differential equation, and wherein simulating said plurality of estimated future states comprises solving said at least one differential equation using said proposed control output vector and said current state vector.

12. The method of claim 11, wherein solving said at least one differential equation comprises solving said at least one differential equation according to one of a Runge-Kutta method and a difference equation technique.

13. The method of claim 1, wherein obtaining said current state vector comprises:

obtaining at least one sensor input value from a sensor associated with said injection molding machine; and estimating said current state of said injection molding machine using said model and said at least one sensor input value.

14. The method of claim 13, wherein estimating said current state of said injection molding machine comprises computing said plurality of state values representative of a current state of said injection molding machine using said model, and forming said current state vector using said computed state values.

15. The method of claim 14, wherein said model comprises at least one differential equation, and wherein computing said plurality of state values comprises solving said at least one differential equation according to one of a Runge-Kutta method and a difference equation technique.

16. The method of claim 1, further comprising saving at least a portion of said most recently refined proposed control output vector, wherein providing a first proposed control output vector comprises providing said first proposed control output vector according to a previously saved proposed control output vector from a previous control cycle.

17. The method of claim 1, wherein said termination condition comprises one of a predetermined time elapsing, a predetermined number of iterations occurring, said most recently refined error being less than a threshold value, and a rate of change of said most recently refined error being less than a threshold value.

18. The method of claim 1, wherein refining said proposed control output vector according to an error comprises:

correlating a plurality of coefficients from said proposed control output vector according to a control output function;

evaluating a plurality of partial differential equations for error with respect to said plurality of coefficients;

adjusting at least one of said plurality of coefficients so as to reduce said error; and translating an adjusted plurality of coefficients according to said control output function to provide said refined proposed control output vector.

19. The method of claim 18, wherein adjusting at least one of said plurality of coefficients so as to reduce said error comprises adjusting at least one of said plurality of coefficients using a conjugate gradient method so as to reduce said error.

20. The method of claim 18, further comprising saving at least a portion of said adjusted plurality of coefficients, wherein providing a first proposed control output vector comprises providing said first proposed control output vector according to a previously saved portion of said adjusted plurality of coefficients from a previous control cycle.

21. A method for controlling motion or pressure in an injection molding machine, comprising:

obtaining at least one sensor input value from a sensor associated with said injection molding machine;

estimating a current state of said injection molding machine using said at least one sensor input value and a model with a plurality of state equations representative of behavior of said injection molding machine;

providing a proposed control output vector having a plurality of control output values representative of control outputs at a current time and at future times;

simulating a plurality of estimated future states of said injection molding machine according to said proposed control output vector using said current state and said model;

determining an error between said plurality of estimated future states and a plurality of desired future states;

recursively refining said proposed control output vector according to an error between estimated future states and said plurality of desired future states, simulating refined estimated future states of said injection molding machine according to said refined proposed control output vector using said current state and said model, and determining a refined error between said refined estimated future states and said desired future states until a termination condition occurs; and providing a control output to at least one actuator in said injection molding machine according to said most recently refined proposed control output vector.

22. The method of claim 21, wherein estimating said current state of said injection molding machine comprises:

computing a plurality of state values representative of said current state of said injection molding machine using said model; and forming a current state vector using said computed state values.

23. The method of claim 22, wherein said model comprises at least one differential equation, and wherein computing said plurality of state values comprises solving said at least one differential equation according to one of a Runge-Kutta method and a difference equation technique.

24. The method of claim 21:

wherein providing a proposed control output vector comprises providing a first proposed control output vector having a plurality of control output values representative of control outputs at said current time and at future times;

wherein simulating a plurality of estimated future states comprises simulating a first plurality of estimated future states of said injection molding machine according to said first proposed control output vector using said current state and said model;

wherein determining an error between said plurality of estimated future states and a plurality of desired future states comprises determining a first error between said first plurality of estimated future states and a plurality of desired future states;

wherein recursively refining said proposed control output vector, simulating refined estimated future states and, determining a refined error comprises:

providing a first refined proposed control output vector according to said first error so as to reduce said first error;

simulating a first refined plurality of estimated future states of said injection molding machine according to said first refined proposed control output vector using said current state and said model;

determining a first refined error between said first refined plurality of estimated future states and said plurality of desired future states; and wherein providing said control output comprises providing a control output to said at least one actuator according to said first refined proposed control output vector.

25. The method of claim 24, further comprising:

providing a second refined proposed control output vector according to said first refined error so as to reduce said first refined error;

simulating a second refined plurality of estimated future states of said injection molding machine according to said second refined proposed control output vector using said current state and said model;

determining a second refined error between said second refined plurality of estimated future states and said plurality of desired future states; and providing said control output to said at least one actuator according to said second refined proposed control output vector.

26. The method of claim 25, further comprising saving at least a portion of said second refined proposed control output vector, wherein providing a first proposed control output vector comprises providing said first proposed control output vector according to a previously saved proposed control output vector from a previous control cycle.

27. The method of claim 25, wherein said termination condition comprises one of a predetermined time elapsing, a predetermined number of iterations occurring, said most recently refined error being less than a threshold value, and a rate of change of said most recently refined error being less than a threshold value.

28. The method of claim 25, wherein said model comprises at least one differential equation, and wherein simulating said plurality of estimated future states comprises solving said at least one differential equation using said proposed control output vector and said current state.

29. The method of claim 28, wherein solving said at least one differential equation comprises solving said at least one differential equation according to one of a Runge-Kutta method and a difference equation technique.

30. The method of claim 21, wherein said model comprises at least one differential equation, and wherein simulating said plurality of estimated future states comprises solving said at least one differential equation using said proposed control output vector and said current state.

31. The method of claim 30, wherein solving said at least one differential equation comprises solving said at least one differential equation according to one of a Runge-Kutta method and a difference equation technique.

32. The method of claim 21, further comprising saving at least a portion of said most recently refined proposed control output vector, wherein providing a first proposed control output vector comprises providing said first proposed control output vector according to a previously saved proposed control output vector from a previous control cycle.

33. The method of claim 21, wherein said termination condition comprises one of a predetermined time elapsing, a predetermined number of iterations occurring, said most recently refined error being less than a threshold value, and a rate of change of said most recently refined error being less than a threshold value.

34. The method of claim 25, wherein estimating said current state of said injection molding machine comprises:

computing a plurality of state values representative of said current state of said injection molding machine using said model; and forming a current state vector using said computed state values.

35. The method of claim 34, wherein said model comprises at least one differential equation, and wherein computing said plurality of state values comprises solving said at least one differential equation according to one of a Runge-Kutta method and a difference equation technique.

36. The method of claim 21, wherein refining said proposed control output vector according to an error comprises:
   correlating a plurality of coefficients from said proposed control output vector according to a control output function;
   evaluating a plurality of partial differential equations for error with respect to said plurality of coefficients;
   adjusting at least one of said plurality of coefficients so as to reduce said error; and
   translating an adjusted plurality of coefficients according to said control output function to provide said refined proposed control output vector.

37. The method of claim 36, wherein adjusting at least one of said plurality of coefficients so as to reduce said error comprises adjusting at least one of said plurality of coefficients using a conjugate gradient method so as to reduce said error.

38. A system for controlling motion or pressure in a non-linear injection molding machine, comprising:
   a model comprising a plurality of state equations representative of behavior of said injection molding machine;
   a current state vector comprising a plurality of state values representative of a current state of said injection molding machine; and
   a control law, comprising:
      a simulator component operative to simulate a plurality of estimated future states of said injection molding machine according to a proposed control output vector having a plurality of control output values representative of control outputs at a current time and at future times using said current state vector and said model;
      an error function evaluator operative to determine an error between said plurality of estimated future states and a plurality of desired future states; and
      an adjustment rule operative to adjust said proposed control output vector according to said error to provide a refined proposed control output vector;
   wherein said control law is operative to recursively refine said proposed control output vector using said adjustment rule, to simulate refined estimated future states using said simulator, and to determine a refined error between said refined estimated future states and said desired future states until a termination condition occurs, and wherein said control law is operative to provide a control output to at least one actuator in said injection molding machine according to a most recently refined proposed control output vector.

39. The system of claim 38, further comprising an observer receiving at least one sensor input value from a sensor associated with said injection molding machine, wherein said observer is operative to estimate said current state of said injection molding machine using said model and said at least one sensor input value.

40. The system of claim 39, wherein said model comprises at least one differential equation, and wherein said observer is operative to solve said at least one differential equation using said proposed control output vector and said current state vector.

41. The system of claim 38, wherein said model comprises at least one differential equation, and wherein said simulator is operative to solve said at least one differential equation using said proposed control output vector and said current state vector.

42. The system of claim 41, wherein said simulator is operative to solve said at least one differential equation according to one of a Runge-Kutta method and a difference equation technique.

43. The system of claim 38, wherein said control law is operative to save at least a portion of said most recently refined proposed control output vector, and wherein said control law is operative to provide a first proposed control output vector according to a previously saved proposed control output vector from a previous control cycle.

44. The system of claim 38, wherein said termination condition comprises one of a predetermined time elapsing, a predetermined number of iterations occurring, said most recently refined error being less than a threshold value, and a rate of change of said most recently refined error being less than a threshold value.

45. The system of claim 38, wherein said control law further comprises a control output function and a control output parameter translator, wherein said adjustment rule is operative to correlate a plurality of coefficients from said proposed control output vector according to said control output function, to evaluate a plurality of partial differential equations for error with respect to said plurality of coefficients, and to adjust at least one of said plurality of coefficients so as to reduce said error, and wherein said control output parameter translator is operative to translate an adjusted plurality of coefficients according to said control output function to provide said refined proposed control output vector.

46. The system of claim 45, wherein said adjustment rule is operative to adjust at least one of said plurality of coefficients using a conjugate gradient method.

47. The system of claim 38, wherein said control law provides said control output to at least one electric motor to control a motion or a pressure in said injection molding machine according to said most recently refined proposed control output vector.

48. A system for controlling motion or pressure in an injection molding machine, comprising:
   a model comprising a plurality of state equations representative of behavior of said injection molding machine;
   an observer receiving at least one sensor input value from a sensor associated with said injection molding machine, wherein said observer is operative to estimate said current state of said injection molding machine using said model and said at least one sensor input value to provide a current state vector comprising a plurality of state values representative of a current state of said injection molding machine; and
   a control law, comprising:
      a simulator component operative to simulate a plurality of estimated future states of said injection molding machine according to a proposed control output vector having a plurality of control output values representative of control outputs at a current time and at future times using said current state vector and said model;
      an error function evaluator operative to determine an error between said plurality of estimated future states and a plurality of desired future states; and
      an adjustment rule operative to adjust said proposed control output vector according to said error to provide a refined proposed control output vector;
   wherein said control law is operative to recursively refine said proposed control output vector using said adjustment rule, to simulate refined estimated future states using said simulator, and to determine a refined error between said refined estimated future states and said desired future states until a termination condition occurs, and wherein said control law is operative to provide a control output to at least one actuator in said injection molding machine according to a most recently refined proposed control output vector.

49. The system of claim 48, wherein said model comprises at least one differential equation, and wherein said observer is operative to solve said at least one differential equation using said proposed control output vector and said current state vector.

50. The system of claim 48, wherein said model comprises at least one differential equation, and wherein said simulator is operative to solve said at least one differential equation using said proposed control output vector and said current state vector.

51. The system of claim 50, wherein said simulator is operative to solve said at least one differential equation according to one of a Runge-Kutta method and a difference equation technique.

52. The system of claim 48, wherein said control law is operative to save at least a portion of said most recently refined proposed control output vector, and wherein said control law is operative to provide a first proposed control output vector according to a previously saved proposed control output vector from a previous control cycle.

53. The system of claim 48, wherein said termination condition comprises one of a predetermined time elapsing, a predetermined number of iterations occurring, said most recently refined error being less than a threshold value, and a rate of change of said most recently refined error being less than a threshold value.

54. The system of claim 48, wherein said control law further comprises a control output function and a control output parameter translator, wherein said adjustment rule is operative to correlate a plurality of coefficients from said proposed control output vector according to said control output function, to evaluate a plurality of partial differential equations for error with respect to said plurality of coefficients, and to adjust at least one of said plurality of coefficients so as to reduce said error, and wherein said control output parameter translator is operative to translate an adjusted plurality of coefficients according to said control output function to provide said refined proposed control output vector.

55. The system of claim 54, wherein said adjustment rule is operative to adjust at least one of said plurality of coefficients using a conjugate gradient method.

56. The system of claim 48, wherein said control law provides said control output to at least one electric motor to control a motion or a pressure in said injection molding machine according to said most recently refined proposed control output vector.

57. A method for controlling motion or pressure in an injection molding machine, comprising:

providing a proposed control output vector having a plurality of control output values representative of control outputs at a current time and at future times;

simulating a plurality of estimated future states of said injection molding machine according to said proposed control output vector using a model;

determining an error between said plurality of estimated future states and a plurality of desired future states;

refining said proposed control output vector according to an error between estimated future states and said plurality of desired future states; and providing a control output to at least one actuator in said injection molding machine according to a refined proposed control output vector.

58. The method of claim 57, wherein refining said proposed control output vector comprises recursively simulating refined estimated future states of said injection molding machine according to said refined proposed control output vector using a current state and said model, and determining a refined error between said refined estimated future states and said desired future states until a termination condition occurs.

59. A computer readable medium having computer-executable instructions for controlling motion or pressure in an injection molding machine, comprising computer-executable instructions for:

providing a proposed control output vector having a plurality of control output values representative of control outputs at a current time and at future times;

simulating a plurality of estimated future states of said injection molding machine according to said proposed control output vector using a model;

determining an error between said plurality of estimated future states and a plurality of desired future states;

refining said proposed control output vector according to an error between estimated future states and said plurality of desired future states; and providing a control output to at least one actuator in said injection molding machine according to a refined proposed control output vector.

60. The computer readable medium of claim 59, wherein the computer-executable instructions for refining said proposed control output vector comprise computer-executable instructions for recursively simulating refined estimated future states of said injection molding machine according to said refined proposed control output vector using a current state and said model, and computer-executable instructions for determining a refined error between said refined estimated future states and said desired future states until a termination condition occurs.

* * * * *